(12) United States Patent  
Fubuki

(10) Patent No.: US 10,020,700 B2  
(45) Date of Patent: Jul. 10, 2018

(54) ROTARY ELECTRIC MACHINE ROTOR

(71) Applicant: TOYOTA JIDOSHA KABUSHIKI KAISHA, Toyota-shi, Aichi-ken (JP)

(72) Inventor: Shingo Fubuki, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 214 days.

(21) Appl. No.: 15/102,371

(22) PCT Filed: Dec. 4, 2014

(86) PCT No.: PCT/IB2014/002646  
§ 371 (c)(1),  
(2) Date: Jun. 7, 2016

(87) PCT Pub. No.: WO2015/087124  
PCT Pub. Date: Jun. 18, 2015

(65) Prior Publication Data  
US 2016/0315512 A1    Oct. 27, 2016

(30) Foreign Application Priority Data  
Dec. 13, 2013    (JP) ................................. 2013-258711

(51) Int. Cl.  
*H02K 1/27*    (2006.01)  
*H02K 1/02*    (2006.01)  
*H02K 21/16*    (2006.01)

(52) U.S. Cl.  
CPC .............. *H02K 1/276* (2013.01); *H02K 1/02* (2013.01); *H02K 1/2766* (2013.01); *H02K 21/16* (2013.01)

(58) Field of Classification Search  
CPC ............................ H02K 1/276; H02K 1/2766  
USPC ......... 310/156.53, 156.56, 216.015–216.018  
See application file for complete search history.

(56) References Cited

FOREIGN PATENT DOCUMENTS

| JP | 2010-141989 A | 6/2010 |
|---|---|---|
| JP | 2013-051835 A | 3/2013 |
| JP | 2013-110827 A | 6/2013 |
| JP | 2013-165625 A | 8/2013 |

*Primary Examiner* — Terrance Kenerly  
(74) *Attorney, Agent, or Firm* — Sughrue Mion, PLLC

(57) ABSTRACT

A rotor (12) includes i) a stacked body (24) in which a plurality of holed steel plates (28a, 28b) provided with holes (29, 30) punched out of insulation coated steel plates are stacked together, and that includes a plurality of magnet holes (34) each of which is provided by the plurality of holes (29, 30) being connected together in an axial direction, and ii) a plurality of magnets (31n, 31s), at least one of which is arranged in each of the magnet holes (34). The plurality of holed steel plates (28a, 28b) include a first holed steel plate (28a) that contacts a first magnet (31n) that is one magnet, of two magnets (31n, 31s) that are adjacent in a circumferential direction from among the plurality of magnets (31n, 31s), and supports the first magnet (31n), at at least one circumferential portion, but does not contact a second magnet (31s) that is another magnet, and a second holed steel plate (28b) that contacts the second magnet (31s) and supports the second magnet (31s), but does not contact the first magnet (31n, 38n, 50n, 60n).

8 Claims, 21 Drawing Sheets

[COMPARATIVE EXAMPLE]

ROTARY ELECTRIC MACHINE ROTOR

BACKGROUND OF THE INVENTION

1. Field of the Invention

The invention relates to a rotary electric machine rotor that includes a stacked body in which a plurality of steel plates are stacked together, and a plurality of magnets of which at least one is arranged in each magnet hole in the stacked body. More particularly, the invention relates to technology that reduces eddy current loss.

2. Description of Related Art

In a related rotary electric machine rotor, a structure that uses a rotor core that includes a stacked body of a plurality of steel plates is known. Also, a rotor with magnets in which magnet holes are formed through, in an axial direction, the stacked body in a plurality of locations in a circumferential direction, and magnets are arranged in these magnet holes, is also known.

Japanese Patent Application Publication No. 2013-165625 (JP 2013-165625 A) describes a structure of a rotary electric machine rotor having a plurality of magnets inserted into respective magnet holes, in which contact between two magnets is inhibited by resin being filled in between the magnets. The plurality of magnets contact the steel plates that form the rotor core, inside the magnet holes.

Japanese, Patent Application Publication No. 2010-141989 (JP 2010-141989 A) describes a structure of a rotary electric machine rotor having a plurality of magnets inserted into respective magnet holes, in which a resin foam sheet is arranged between the magnets, and the magnets are pushed against an inside surface of the magnet holes by thermal expansion of this sheet. The plurality of magnets contact the steel plates that form the rotor core, inside the magnet holes. JP 2010-141989 A also describes applying a surface coating to the magnets.

With the structure described in JP 2013-165625 A or JP 2010-141989 A, when forming the stacked body by stacking the plurality of holed steel plates in which holes have been formed by punching out insulation coated steel plates, adjacent holed steel plates contact each other via the insulation coating. In this case, adjacent holed steel plates are essentially not electrically connected together via connecting portions, but there is conduction between the holed steel plates and the magnets. Therefore, if eddy currents are generated in magnets that are adjacent in the circumferential direction, the eddy currents may short-circuit via the plurality of holed steel plates and become large, resulting in increased eddy current loss. Eddy current loss may be inhibited by inhibiting contact between the magnets and the steel plates by providing an insulation coating to the surface of the magnets by a coating forming process, but this would increase the cost of the magnets. Neither JP 2010-141989 A nor JP 2013-165625 A describes means for solving such a problem.

SUMMARY OF THE INVENTION

In view of the foregoing problem, the invention provides a rotary electric machine rotor capable of inhibiting eddy current loss without using a coating forming process on the magnets.

One aspect of the invention relates to a rotary electric machine rotor that includes a plurality of magnets and a stacked body. The stacked body is provided with a plurality of holed steel plates, in which holes are punched out of insulation coated steel plates, that are stacked together, and the stacked body includes a plurality of magnet holes each of which is provided by the plurality of holes being connected together in an axial direction. At least one of the plurality of magnets is arranged in each of the magnet holes. The stacked body has a first holed steel plate and a second holed steel plate. The first holed steel plate contacts a first magnet, of two magnets that are adjacent in a circumferential direction from among the plurality of magnets at at least one circumferential portion, and the first holed steel plate supports the first magnet at at least one circumferential portion, and the first holed steel plate does not contact a second magnet. The second holed steel plate contacts the second magnet and the second holed steel plate supports the second magnet, and does not contact the first magnet.

Also, with the rotary electric machine rotor described above, the first magnet and the second magnet may be two adjacent magnets that are closest to each other in the circumferential direction, from among the plurality of magnets.

Also, with the rotary electric machine rotor described above, the first magnet and the second magnet may be arranged one in each of two magnet holes that are adjacent in the circumferential direction, from among the plurality of magnet holes.

Also, with the rotary electric machine rotor described above, the first magnet and the second magnet may be arranged next to each other in the circumferential direction in one magnet hole, from among the plurality of magnet holes.

Also, with the rotary electric machine rotor described above, the first magnet and the second magnet may be arranged at a first magnetic pole of the rotary electric machine rotor, and the plurality of magnets may include a third magnet and a fourth magnet that are arranged next to each other in the circumferential direction at a second magnetic pole of the rotary electric machine rotor, the second magnetic pole being adjacent to the first magnetic pole. Also, a position of contact between the stacked body, and the first magnet, the second magnet; the third magnet, and the fourth magnet may be arranged symmetrically on both sides of an inter-magnetic pole plane that passes through the first and the second magnetic poles. The inter-magnetic pole plane includes a central axis of the stacked body.

Also, with the rotary electric machine rotor described above, the first magnet and the fourth magnet may be arranged to an outside of the second magnet and the third magnet. Also, the first holed steel plate may contact the first magnet and the fourth magnet symmetrically with respect to the inter-magnetic pole plane, and the first holed steel plate may not contact the second magnet and the third magnet. Also, the second holed steel plate may contact the second magnet and the third magnet symmetrically with respect to the inter-magnetic pole plane, and the second holed steel plate may not contact the first magnet and the fourth magnet.

Also, with the rotary electric machine rotor described above, a position of contact between the stacked body and the plurality of magnets arranged at a first magnetic pole of the rotary electric machine rotor, or a position of contact between the stacked body and the plurality of magnets arranged at the first and a second magnetic poles of the rotary electric machine rotor, the first and the second magnetic poles being adjacent in the circumferential direction, may be gradually offset in one axial direction, in an order of the magnets lined up in one circumferential direction, at at least one portion in the axial direction.

With the rotary electric machine rotor described above, a position of contact between the stacked body, and at least one of the first magnet or the second magnet may be arranged in at least two locations that are separated by a noncontact portion in the axial direction, inside the magnet hole where the first magnet or the second magnet is arranged, from among the plurality of magnet holes.

With the foregoing rotary electric machine rotor according to the invention, eddy current loss is able to be inhibited without using a coating forming process on the magnets.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
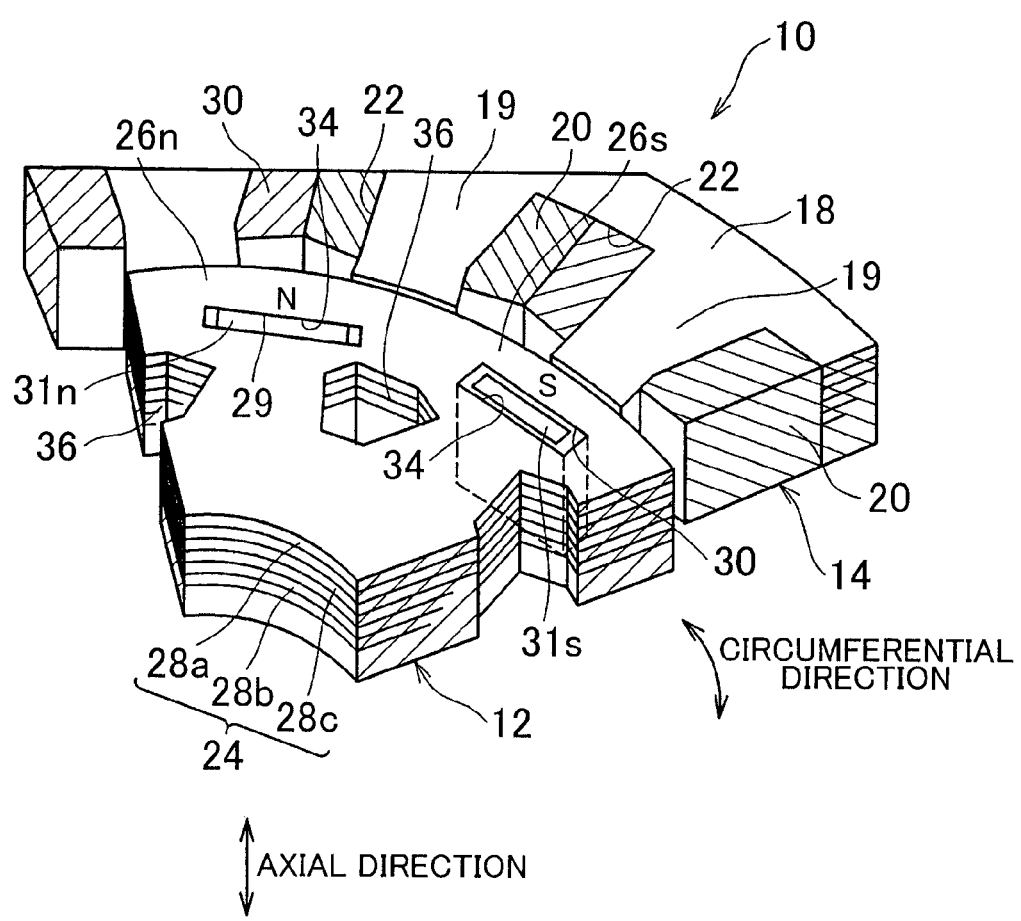
FIG. 1 is a perspective view of a rotary electric machine that includes a rotary electric machine rotor according to a first example embodiment of the invention, shown partially cut away.

Hereinafter, first to ninth example embodiments of the invention will be described with reference to the accompanying drawings. In the description, the specific shapes, materials, and number of pieces and the like are merely examples to facilitate understanding of the invention, and may be changed as appropriate according to specifications.

In the first to ninth example embodiments described below, like constituent elements will be denoted by like reference characters in all of the drawings.

A rotary electric machine 10 that includes a rotary electric machine rotor (hereinafter, simply referred to as "rotor") 12 according to a first example embodiment of the invention is used as an electric motor for driving a hybrid vehicle, for example, or as an electric generator, or as a motor-generator that has both of these functions. The rotary electric machine 10 is able to be used as a running motor of an electric vehicle other than a hybrid vehicle, or a fuel cell vehicle.

Figure 2:
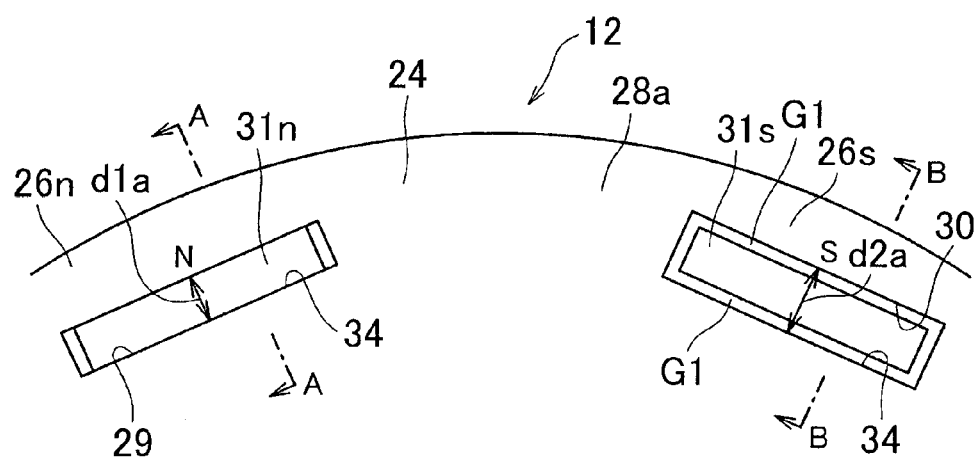
FIG. 2 is a view of the rotor shown in FIG. 1 as viewed from one side in an axial direction.
Figure 3:
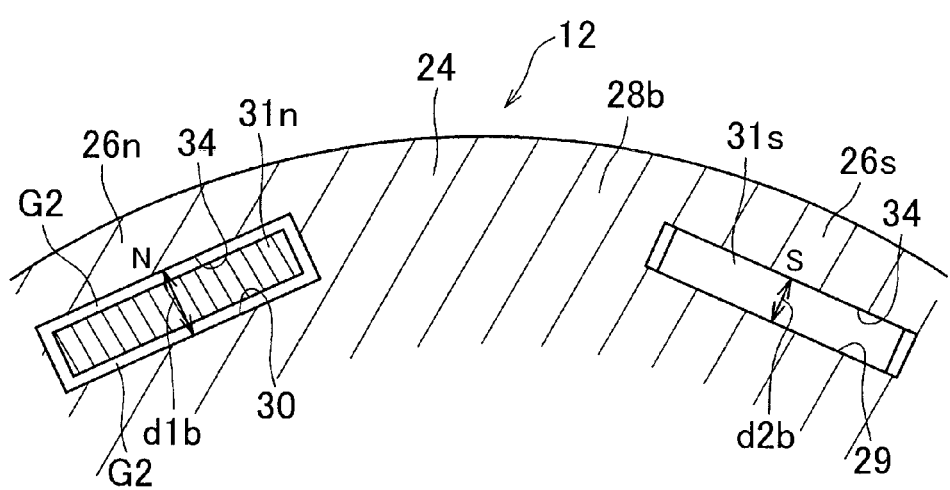
FIG. 3 is a view of the rotor shown in FIG. 1 cut away at an axially intermediate portion.

FIG. 1 is a view of the rotary electric machine 10 that includes the rotor 12 of the first example embodiment shown partially cut away. FIG. 2 is a view of the rotor shown in FIG. 1, as viewed from one side in the axial direction (i.e., one axial side), and FIG. 3 is a view of the rotor 12 shown in FIG. 1 cut at an axially intermediate portion.

The rotary electric machine 10 is a permanent-magnet synchronous motor that is driven by three phase alternating current. This rotary electric machine 10 includes a stator 14 fixed to an inside of a motor case, not shown, the rotor 12 that is arranged opposite and to a radial inside of the stator 14 with predetermined gap therebetween, and is able to rotate with respect to the stator 14, and a rotating shaft 16 shown in FIG. 9A that will be described later. A radial direction is a radial direction orthogonal to a rotational central axis O (FIG. 9A) of the rotor 12. An axial direction is a direction parallel to the rotational central axis O of the rotor 12. A circumferential direction is a direction along a circle drawn centered around the rotational central axis O of the rotor 12. The rotating shaft 16 is fixed passing, through the center portion of the rotor 12 and is rotatably supported by the motor case.

The stator 14 includes a stator core 18, teeth 19 arranged at equidistant positions in a plurality of locations in the circumferential direction of the stator core 18, and stator windings 20 of a plurality of phases (more specifically, three phases, i.e., a U-phase, a V-phase, and a W-phase) that are wound around the teeth 19. More specifically, the plurality of teeth 19 that protrude radially inward (toward the rotor 12) are arranged at intervals in the circumferential direction of the stator 14, on an inner peripheral surface of the stator core 18. Slots 22 are formed between the teeth 19. The stator core 18 and the plurality of teeth 19 are integrally formed by a stacked body that is formed by a plurality of stacked magnetic steel plates.

The various-phase stator windings 20 are wound, in either a concentrated winding or a distributed winding, through the slots 22 and around the teeth 19. Stator magnetic poles are formed by the stator windings 20 being wound around the teeth 19. FIG. 1 is a view showing a frame format of a cuboid cross-section of the plurality of stator windings 20. The plurality of teeth 19 arranged in the circumferential direction are then magnetized by alternating current of a plurality of phases flowing through the stator windings 20 of a plurality of phases, and consequently a rotating magnetic field that rotates in the circumferential direction is generated in the stator 14. The rotating magnetic field formed in the teeth 19 acts on the rotor 12 from the tip end surface of the teeth 19.

Figure 4:
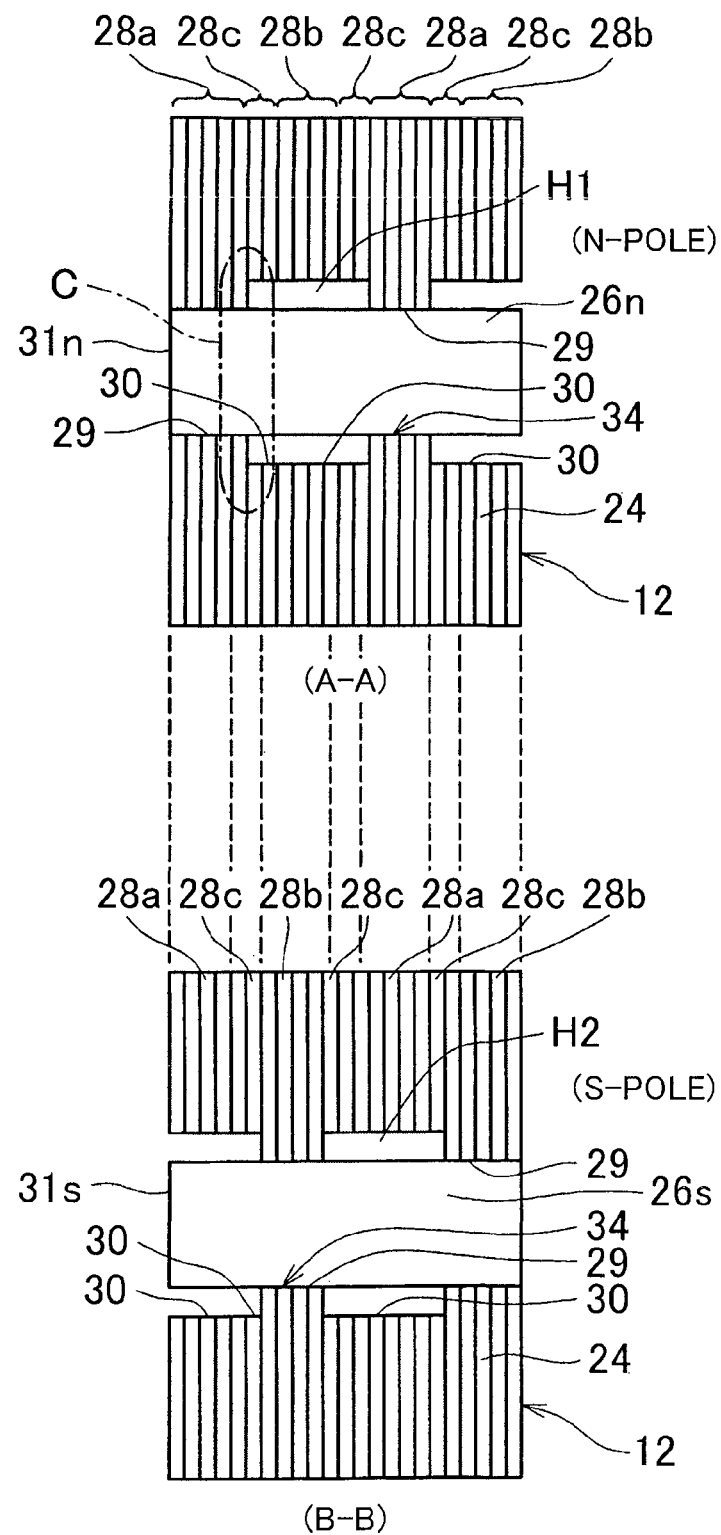
FIG. 4 is a sectional view, the upper part of which is a sectional view taken along line A-A in FIG. 2, and the lower part of which is a sectional view taken along line B-B in FIG. 2.
Figure 5:
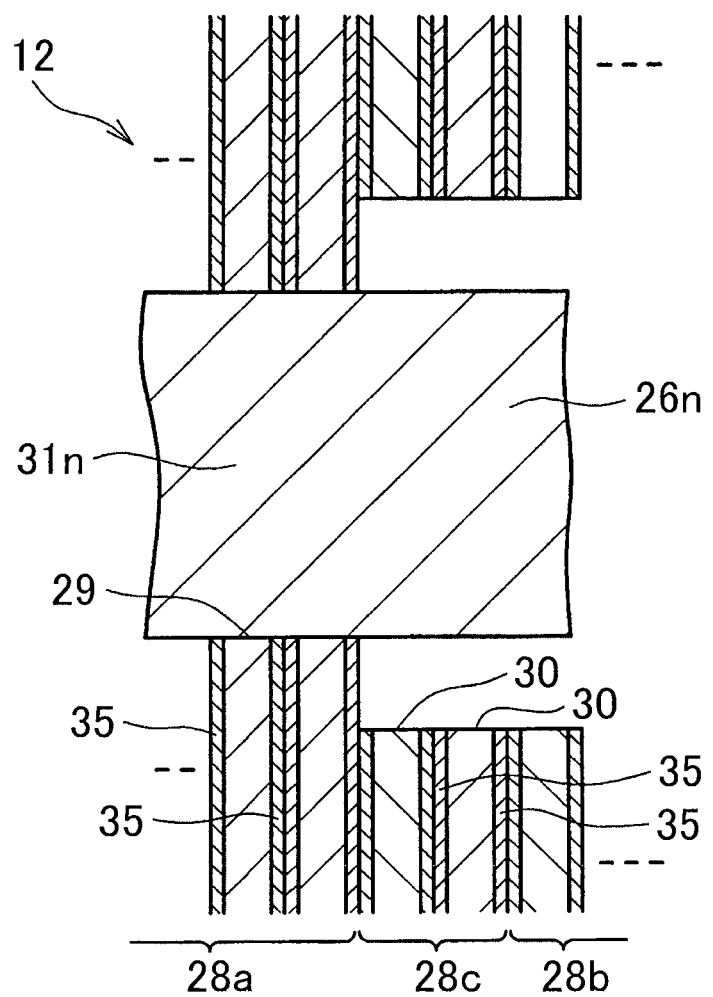
FIG. 5 is an enlarged view of portion C shown in FIG. 4.

The rotor 12 includes a cylindrical stacked body 24, and N-pole magnetic poles 26n and S-pole magnetic poles 26s arranged alternately in a plurality of locations equally spaced in the circumferential direction of the stacked body 24. The stacked body 24 may also be referred to as a "rotor core". The stacked body 24 is integrally formed by a plurality of holed steel plates 28a, 28b, and 28c made of disk-shaped magnetic material, i.e., magnetic steel plates, which are stacked together in the axial direction. As shown in FIGS. 4 and 5 that will be described later, the holed steel plates 28a, 28b, and 28c are insulation coated steel plates provided with an insulation coating 35 on both side surfaces in the thickness direction, and that have holes 29 and 30 formed by punching in the axial direction in a plurality of equally spaced positions in the circumferential direction.

The magnetic poles 26n and 26s are formed including magnets 31n and 31s that are permanent magnets. The stacked body 24 and the plurality, of magnets 31n and 31s will be described later.

The rotor 12 is fixed to an outer radial side of the rotating shaft 16, and is arranged facing the radially inside of the stator 14 across an air gap.

The stacked body 24 includes magnet holes 34 provided through in the axial direction, in a plurality of equally spaced positions in the circumferential direction. The plurality of magnet holes 34 are formed extending in the axial direction in a plurality of positions in the circumferential direction of the stacked body 24. Each of the magnet holes 34 has a rectangular sectional shape in the circumferential direction of the stacked body 24. The magnet holes 34 are formed by connecting the plurality of holes 29 and 30 formed in the plurality of holed steel plates 28a, 28b, and 28c together in the axial direction. A plurality of through-holes 36 to reduce weight are formed in the axial direction farther to the radially inside than the magnet holes 34 of the stacked body 24.

The plurality of magnets 31n and 31s includes a first magnet 31n that is one magnet arranged inserted one into the magnet hole 34 of each N-pole magnetic pole 26n, and a second magnet 31s that is another magnet arranged inserted one into the magnet hole 34 of each S-pole magnetic pole 26s.

Figure 7:
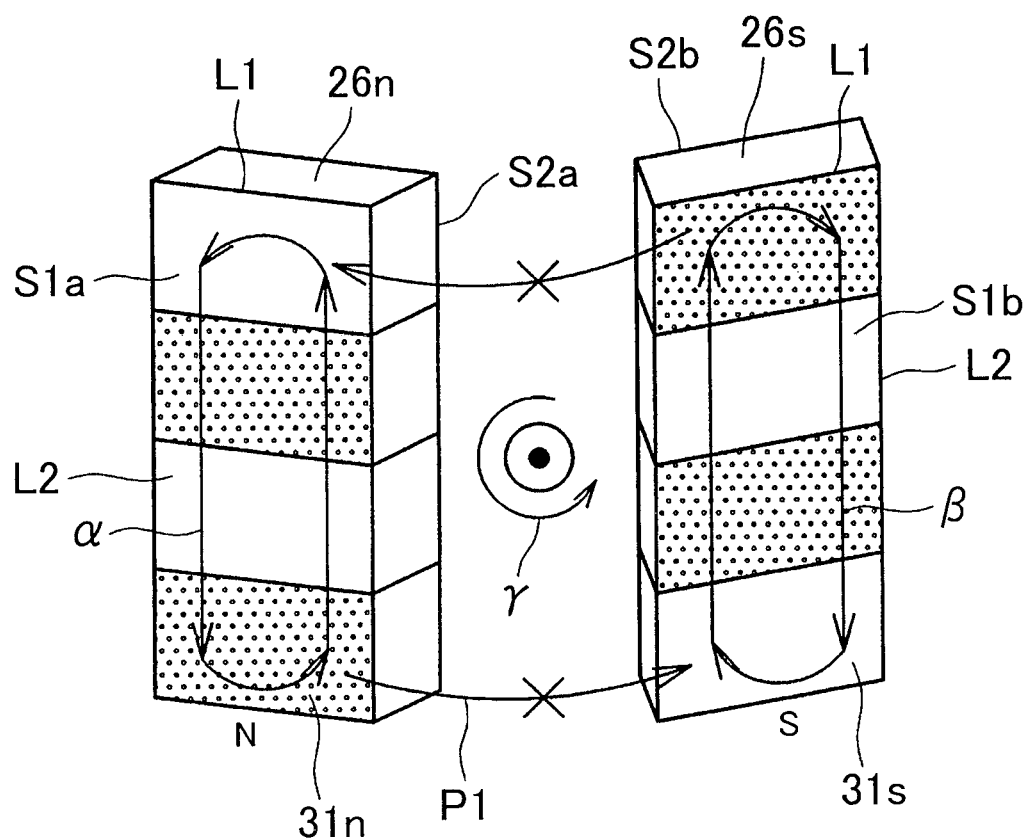
FIG. 7 is a view showing a frame format of an eddy current path viewed from the outer radial side, with the two magnets taken from FIG. 1.

Each of the magnets 31n and 31s has a rectangular parallelepiped shape with a rectangular cross-section orthogonal to the axial direction. With each of the magnets 31n and 31s, a radially outside surface S1a and S1b and a radially inside surface S2a and S2b that are surfaces formed by a side L1 in a length direction and a side L2 in the axial direction of the rectangle of the sectional shape, as shown in FIG. 7, are magnetization surfaces.

The surfaces of the magnets 31n and 31s are so-called coating-less surfaces that do not have an insulation coating formed by insulation using a coating forming process. An oxide layer is formed on the surfaces of the magnets 31n and 31s by leaving them for a predetermined time when manufacturing the magnets. In this specification, this oxide layer is not included in the meaning of the term "insulation coating" described above.

The holed steel plates 28a, 28b, and 28c having different shaped holes 29 and 30 include a plurality of first holed steel plates 28a that are one magnet contacting steel plates, a plurality of second holed steel plates 28b that are other magnet contacting steel plates, and a plurality of intermediate holed steel plates 28c, respectively.

Each of the first holed steel plates 28a and each of the second holed steel plates 28b have the hole 29 and the hole 30 formed alternately in a plurality of equally spaced positions in the circumferential direction.

The first magnet 31n is inserted into the hole 29 in the first holed steel plates 28a, and the second magnet 31s is inserted into the hole 30 in the first holed steel plates 28a. The first holed steel plates 28a support the first magnet 31n by contacting the first magnet 31n with the inside surface of the hole 29 and sandwiching the first magnet 31n from both sides in the radial direction (hereinafter, also referred to as "radial sides"), but the first holed steel plates 28a do not contact the second magnet 31s, not even with the inside surface of the hole 30. In this case, as shown in FIG. 2, with the first holed steel plates 28a, a distance d1a of the hole 29 in the radial direction is smaller than a distance d2a of the hole 30 in the radial direction, and two wall surfaces of the hole 29 that face the radial direction contact both radial side surfaces of the first magnet 31n. With the first holed steel plates 28a, a gap G1 in the radial direction is formed between the inside surface of the hole 30 and both radial side surfaces of the second magnet 31s.

The first magnet 31n is inserted into the hole 30 in the second holed steel plates 28b, and the second magnet 31s is inserted into the hole 29 in the second holed steel plates 28b. The second holed steel plates 28b support the second magnet 31s by contacting the second magnet 31s with the inside surface of the hole 29 and sandwiching the second magnet 31s from both radial sides, but the second holed steel plates 28b do not contact the first magnet 31n, not even with the inside surface of the hole 30. In this case, as shown in FIG. 3, with the second holed steel plates 28b, a distance d2b of the hole 29 in the radial direction is smaller than a distance dib of the hole 30 in the radial direction, and two wall surfaces of the hole 29 that face the radial direction contact both side surfaces of the second magnet 31s in the radial direction. With the second holed steel plates 28b, a gap G2 in the radial direction is formed between the inside surface of the hole 30 and both radial side surfaces of the first magnet 31n.

With the first holed steel plates 28a and the second holed steel plates 28b, the interval of the hole 29 in the circumferential direction may be smaller than the interval of the hole 30 in the circumferential direction, and the inside surface of the hole 29 may be made to contact both surfaces of the first magnet 31n or the second magnet 31s in the circumferential direction.

The first holed steel plates 28a and the second holed steel plates 28b are distinguished by using the adjectives "first" and "second" to indicate that the contact relationship between the magnets and the holes are different. For the first holed steel plates 28a and the second holed steel plates 28b, two holed steel plates of the same shape may be used and the circumferential positions may be relatively offset such that the positional relationship between the magnets and the holes are different.

Each of the intermediate holed steel plates 28c (FIG. 4) has the hole 30 in a plurality of positions equally spaced in the circumferential direction. The distance between both radial side wall surfaces of the holes 30 is greater than the axial lengths of both radial side surfaces of the magnets 31n and 31s, similar to the hole 30 on the right side in FIG. 2 and the hole 30 on the left side in FIG. 3, so the inside surface of the holes 30 does not contact either of the magnets 31n and 31s.

The upper part of FIG. 4 is a view of a sectional view taken along line A-A in FIG. 2, and the lower part of FIG. 4 is a sectional view taken along line B-B in FIG. 2. With the plurality of stacked first holed steel plates 28a, the plurality of stacked intermediate holed steel plates 28c, and the plurality of stacked second holed steel plates 28b each as one set, the stacked body 24 is formed by stacking together one, set of first holed steel plates 28a, one set of intermediate holed steel plates 28c, one set of second holed steel plates 28b, one set of intermediate holed steel plates 28c, one set of first holed steel plates 28a, and so on in this order. The plurality of magnet holes 34 are formed by the plurality of holes 29 and 30 being connected together in the axial direction. There may alternatively be only one intermediate holed steel plate 28c in each set. There may also be only one of each holed steel plate 28a, 28c, and 28b in each set.

The holed steel plates 28a, 28b, and 28c are integrally joined together via concavo-convex engagement, by a crimped portion, not shown, that is formed by press-deforming a portion or a plurality of locations in the circumferential direction, in the axial direction with a jig while the holed steel plates 28a, 28b, and 28c are stacked. In this state, the magnets 31n and 31s are inserted into the magnet holes 34 and prevented from coming out by filling an insulating molten resin into a space at both circumferential end portions of the magnet holes 34 and solidifying it. An air gap may be provided at both circumferential end portions of the holes 36, instead of filling these portions with resin.

The intermediate holed steel plates 28c are provided to stabilize and inhibit electrical conduction between the first holed steel plates 28a and the second holed steel plates 28b via the magnets 31n and 31s. The intermediate holed steel plates 28c that are arranged between the first holed steel plates 28a and the second holed steel plates 28b may be a single plate. If conduction between the holed steel plates 28a and 28b is stable and inhibited, the intermediate holed steel plates 28c may also be omitted.

The plurality of first holed steel plates 28a of the stacked body 24 contact the first magnet 31n in at least two locations that are separated by a noncontact portion H1 in the axial direction, inside the magnet holes 34 where the first magnet 31n shown in the upper part of FIG. 4 are arranged. The plurality of second holed steel plates 28b of the stacked body 24 contact the second magnet 31s in at least two locations that are separated by a noncontact portion H2 in the axial direction, inside the magnet holes 34 where the second magnet 31s shown in the lower part of FIG. 4 is arranged. As a result, the magnets 31n and 31s are prevented from inclining in the axial direction inside the stacked body 24, so the magnets 31n and 31s are prevented from contacting holed steel plates that are not intended to be contacted. If the magnets 31n and 31s are stably supported within the magnet holes 34, the stacked body 24 may be configured to contact the magnets 31n and 31s only at one location in the axial direction, inside the magnet holes 34 where the magnets 31n and 31s are arranged.

The first holed steel plates 28a and the second holed steel plates 28b contact only the first magnet 31n or the second magnet 31s, of the circumferentially adjacent first magnet 31n and second magnet 31s, so eddy current loss is able to be suppressed without using a coating forming process on the magnets 31n and 31s. This will be described later.

Rare-earth magnets, ferrite magnets, or alnico magnets, for example, may be used for the magnets 31n and 31s. As rare-earth magnets, three-component system neodymium magnets in which iron and boron has been added to neodymium, samarium-cobalt magnets formed by a binary alloy of samarium and cobalt, or samarium iron nitrogen magnets may be used. These magnets have a relatively large electric conductivity, so an eddy current may be generated as a result of the effect on the magnetic field from the stator 14, which may result in loss.

Radial polarity of the magnets 31n and 31s arranged in the magnetic poles 26n and 26s differs alternately in the circumferential direction. Therefore, the N-pole magnetic pole 26n and the S-pole magnetic pole 26s are arranged alternately in the circumferential direction on the outer peripheral surface of the rotor 12. Here, the first magnet 31n and the second magnet 31s are next to each other in the circumferential direction, and this is repeated alternately in the circumferential direction.

With the magnets 31n and 31s arranged in the magnet holes 34, a pair of end plates, not shown, may be arranged on both sides of the stacked body 24 in the axial direction, so the stacked body 24 is sandwiched from both sides in the axial direction by the pair of end plates.

With the rotor 12 described above, the stacked body 24 contacts only the first magnet 31n or the second magnet 31s, of the circumferentially adjacent first magnet 31n and the second magnet 31s, at the same cross-section that is orthogonal to the axial direction of the same position in the axial direction. The "same cross-section" is one, cross-section of the first holed steel plates 28a or the second holed steel plates 28b. Therefore, it is possible, to prevent eddy currents that are generated in the first magnet 31n and the second magnet 31s from, short-circuiting via the stacked body 24 and becoming a large eddy current. Also, it is not necessary to provide an insulation coating on the surface of the magnets 31n and 31s using a coating forming process referred to as magnet coating. Thus, eddy current loss can be suppressed at a low cost.

Figure 6:
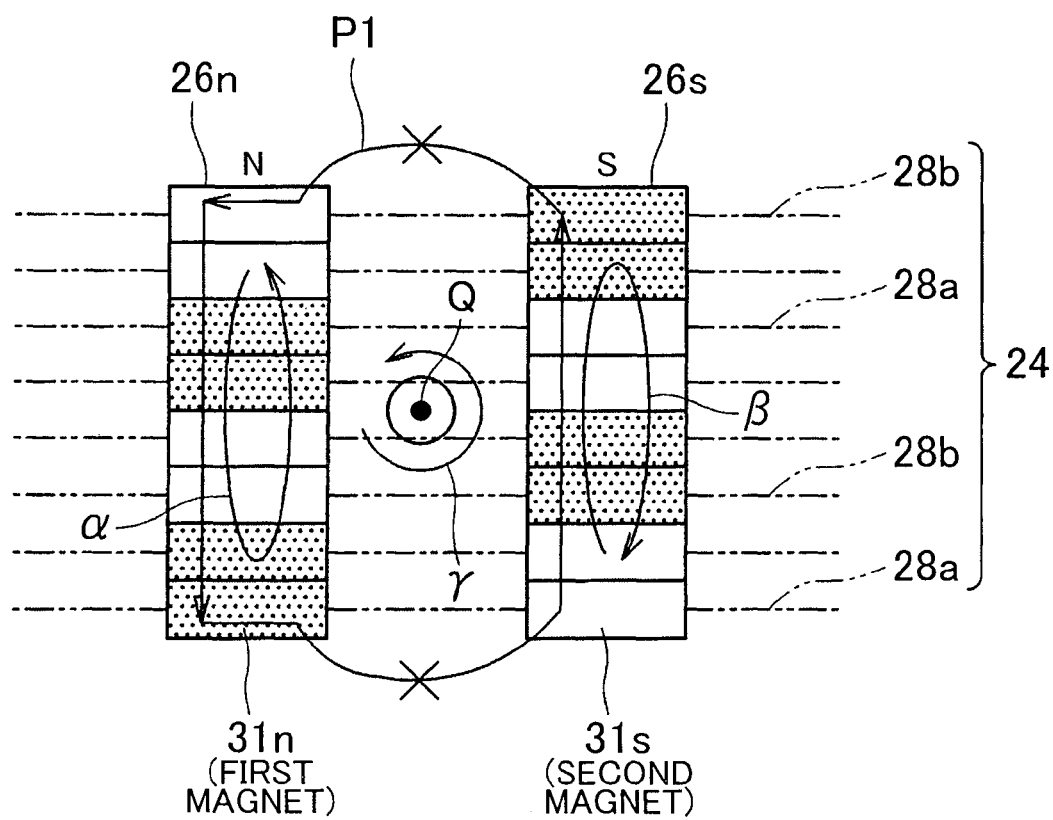
FIG. 6 is a view showing a frame format from a radial direction, of a contact state between a stacked body and two magnets shown in FIG. 1.
Figure 8:
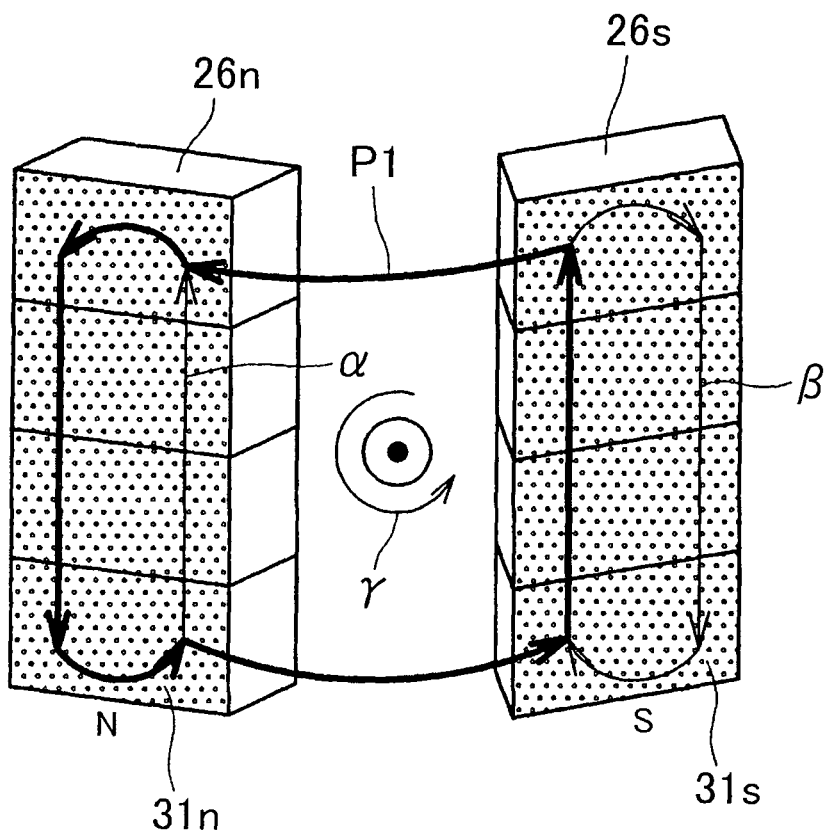
FIG. 8 is a view showing a frame format of an eddy current path corresponding to FIG. 7, in a rotor of a comparative, example.

FIG. 6 is a view showing a frame format from the radial direction, of a contact state between a stacked body 24 and the first magnet 31n and the second magnet 31s shown in FIG. 1. FIG. 7 is a view showing a frame format of an eddy current path viewed from the outer radial side, with the first magnet 31n and the second magnet 31s taken from FIG. 1. FIG. 8 is a view showing a frame format corresponding to FIG. 7, in a rotor of a comparative example. FIG. 6 shows the holed steel plates 28a and 28b contacting the portions of the magnets 31n and 31s indicated by dots. The intermediate holed steel plates 28c are omitted in FIG. 6. The holed steel plates 28a and 28b are indicated by alternate long and two short dashes lines. A plurality of rectangles shown inside the magnets 31n and 31s are contact portions or noncontact portions with respect to each of the holed steel plates, and all have the same length in the axial direction.

In this case, eddy currents are generated in opposite directions, as shown by arrows α and β, according to the orientation of the generated magnetic flux of the magnets 31n and 31s. Also, a fluctuating magnetic flux generated in a q-axis direction offset 90 degrees of electrical angle with respect to a d-axis direction along the magnetic pole direction, i.e., a q-axis magnetic flux, may be applied from the stator 14 to, the rotor 12 in a position indicated by Q between the two magnets 31n and 31s, in response to alternating current flowing through the stator windings 20 shown in FIG. 1. In this case, the eddy currents try to be generated in a direction indicated by arrow γ around the position indicated by Q, but the insulation coating 35 is provided on the side surface of the adjacent holed steel plates 28a and 28b, so the eddy currents will not short-circuit between the plurality of holed steel plates 28a and 28b. Also, there is no insulation coating on the inside surface of the magnet holes 34 because the holes 29 and 30 are formed in the holed steel plates 28a and 28b by punching. Although there is an oxide coating on the surface of the magnets 31n and 31s, it is highly likely that there will be electrical conduction between the holed steel plates 28a and 28b and the magnets 31n and 31s due to this oxide coating becoming damaged by edge contact with the holed steel plates 28a and 28b. Therefore, there may be electrical conduction between the magnets 31n and 31s and the holed steel plates 28a and 28b at a portion inside the magnet holes 34 where the magnets 31n and 31s contact the holed steel plates 28a and 28b via only the oxide coating.

The holed steel plates 28a, 28b, and 28c are integrally joined together by the crimped portion, so they may be electrically connected not via the insulation coating 35, at a sheared surface that is produced when adjacent holed steel plates are crimped. In this case as well, electrical resistance at the contact portion of the sheared surface is large, so the eddy current loss will not be large enough to be a practical problem. A wide protruding portion entry hole may be formed in advance in another holed steel plate adjacent on the side with the protruding portion of the crimped portion, at a portion or plurality of locations in the axial direction of the stacked body 24, to prevent the sheared surfaces from contacting each other with a wide contact surface when the holed steel plates are jointed together at the crimped portion. As a result, contact between adjacent holed steel plates at a portion where there is no insulation coating near the crimped portion is able to be effectively prevented. In this case, sufficient joining force may not be able to be expected at the portion where the protruding portion and the protruding portion entry hole are arranged, but the joining strength of the stacked body 24 is ensured by the resin used to fix the magnets.

In the comparative example shown in FIG. 8, the entire first magnets 31n and 31s contact the stacked body 24 inside the magnet holes 34. In this comparative example, the two eddy currents of the magnets 31n and 31s short-circuit via the stacked body 24, as shown by arrow P1, becoming a large eddy current, so eddy current loss may be large. In this case, the holed steel plates 28a and 28b that are separated in the axial direction become electrically connected via the magnets 31n and 31s. In the first example embodiment shown in FIGS. 1 to 5, neither of the two magnets 31n and 31s contact the stacked body 24, at the same cross-section of the stacked body 24. Therefore, it is possible to inhibit a large eddy current from being generated, as shown in FIGS. 6 and 7, so eddy current loss is able to be suppressed. Accordingly, a rise in, temperature and thermal demagnetization due to heat generated by the magnets are both able to be suppressed. Also, when the rotary electric machine 10 that includes the rotor 12 is used as a driving motor of a vehicle, fuel efficiency is able to be improved due to loss reduction. Moreover, it is not necessary to provide an insulation coating using a coating forming process on the magnets 31n and 31s, so cost can be reduced.

Figure 9A:
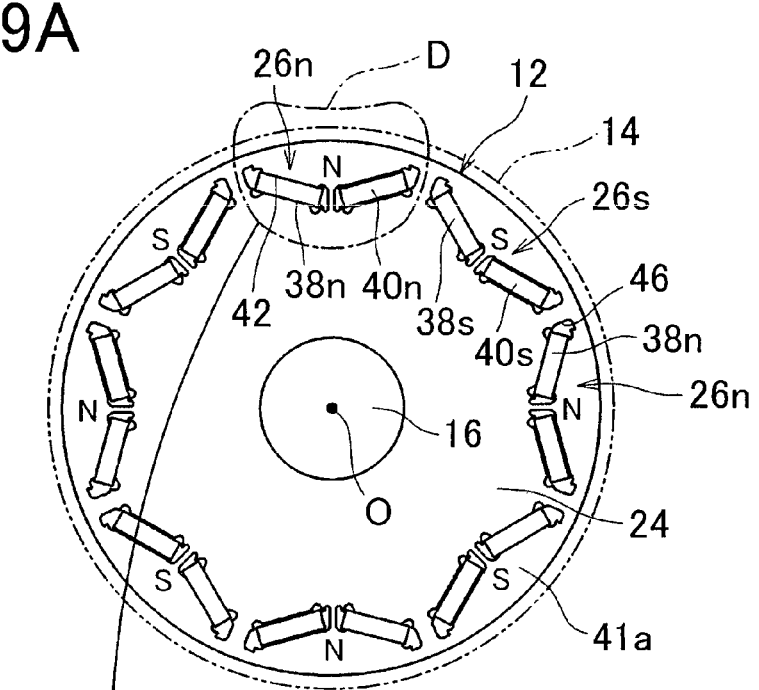
FIG. 9A is an axial end surface view of a rotary electric machine rotor according to a second example embodiment of the invention.
Figure 9B:
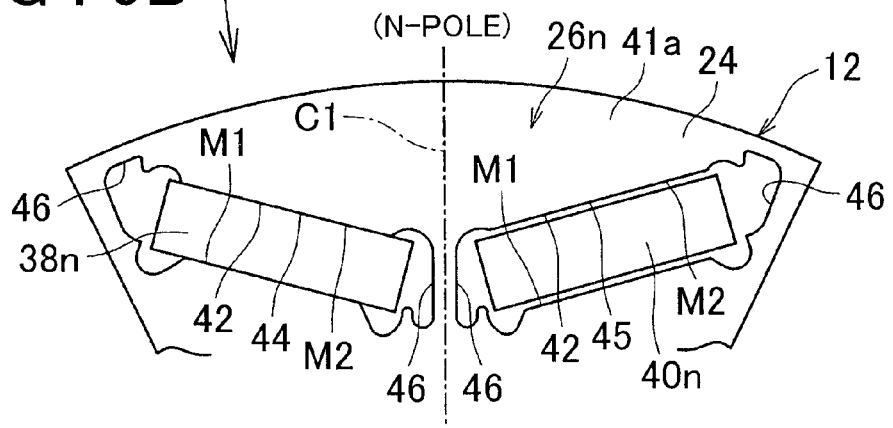
FIG. 9B is an enlarged view of portion D in FIG. 9A.
Figure 10:
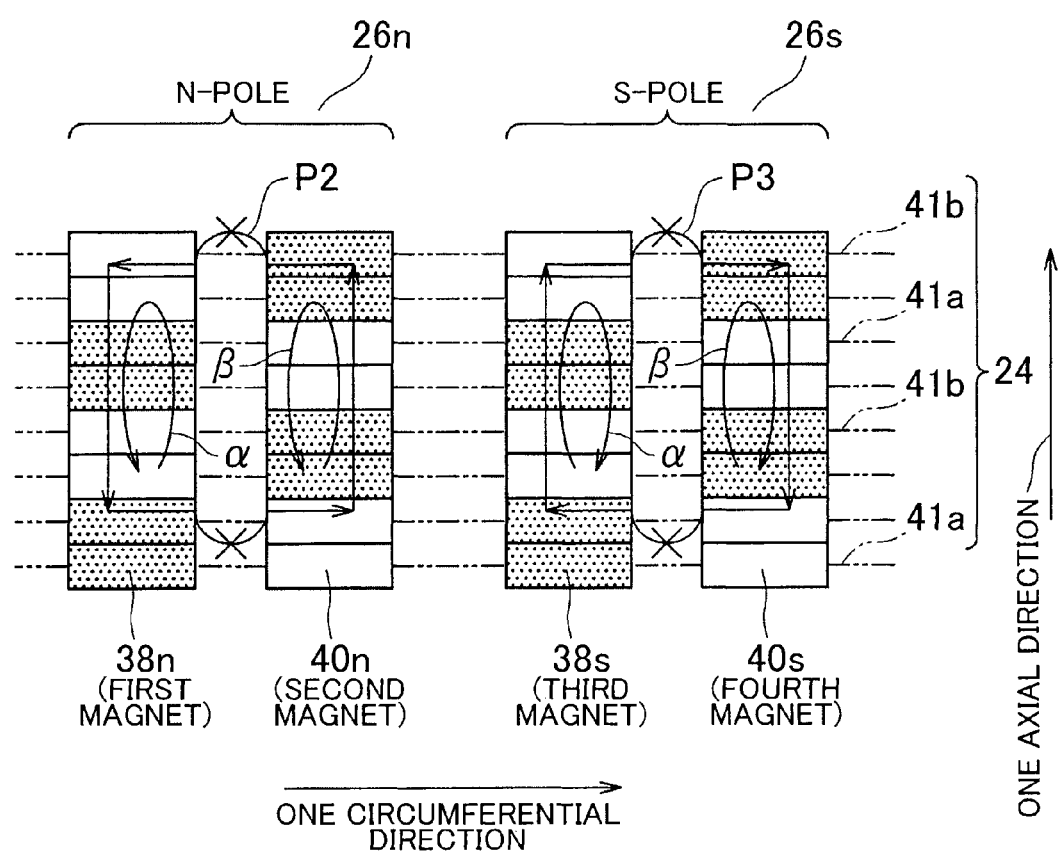
FIG. 10 is a view corresponding to FIG. 6, of N-pole magnets shown in FIGS. 9A and 9B.

Next, a second example embodiment of the invention will be described. An axial end surface view of the rotor 12 of the second example embodiment is shown in FIG. 9A, and an enlarged view of portion D in FIG. 9A is shown in FIG. 9B. FIG. 10 is a view corresponding to FIG. 6, of N-pole magnets 38n and 40n in the second example embodiment shown in FIGS. 9A and 9B. In this second example embodiment, as will be described later, a N-pole magnetic pole 26n includes a first magnet 38n that is one magnet and a second magnet 40n that is another magnet, with these magnets 38n and 40n arranged so as to have a V-shaped cross-section. An S-pole magnetic pole 26s includes a third magnet 38s that is one magnet and a fourth magnet 40 that is another magnet, with these magnets 38s and 40s arranged so as to have a V-shaped cross-section.

The stacked body 24 is formed by stacking together first holed steel plates 41a, second holed steel plates 41b, and intermediate holed steel plates that are not shown, each of which are provided in plurality. The stacked body 24 includes a plurality of magnet holes 42 provided through the stacked body 24 in the axial direction. The magnet holes 42 are formed in a plurality of sets in a plurality of equally spaced positions in the circumferential direction of the stacked body 24, with two magnet holes 42 to a set. The two magnet holes 42 of each set are formed having a V-shaped cross-section that becomes wider toward the radial outside. The magnet holes 42 are each formed by holes 44 and 45 that are formed punched out of the plurality of holed steel plates 28a, 28b, and 28c being connected together in the axial direction.

The magnets 38n, 40n, 38s, and 40s are arranged one in each of the magnet holes 42. Of the plurality of magnets 38n, 40n, 38s, and 40s, the magnets 38n and 40n (or 38s and 40s) that are adjacent in the circumferential direction at each magnetic pole 26n (or 26s) are two adjacent magnets that are closest in the circumferential direction. The magnets 38n, 40n, 38s, and 40s have rectangular parallelepiped shapes similar to the magnets 31n and 31s in FIG. 1. The first magnet 38n, the second magnet 40n, the third magnet 38s, and the fourth magnet 40s are arranged in this order in the circumferential direction in the stacked body 24.

With the first holed steel plates 41a, the distance between inside wall surfaces M1 and M2 on both radial sides of only the hole 44 within which the first magnet 38n and the third magnet 38s are arranged is smaller than it is in the remaining hole 45. As a result, at the N-pole magnetic pole 26n, the first holed steel plates 41a contact only the first magnet 38n of the two magnets 38n and 40n, inside the hole 44, and at the S-pole magnetic pole 26s, the first holed steel plates 41a contact only the third magnet 38s of the two magnets 38s and 40s, inside the hole 44.

With the second holed steel plates 41b (FIG. 10), the distance between inside wall surfaces on both radial sides of only the hole 44 within which the second magnet 40n and the fourth magnet 40s are arranged is smaller than it is in the remaining hole. 45. As a result, at the N-pole magnetic pole 26n, the second holed steel plates 41b contact only the second magnet 40n of the two magnets 38n and 40n, inside the hole 44, and at the S-pole magnetic pole 26s, the second holed steel plates 41b contact only the fourth magnet 40s of the two magnets 38s and 40s, inside the hole 44.

As a result, the positions of contact between the stacked body 24 and the two magnets 38n and 40n (or 38s and 40s) arranged at the magnetic poles 26n and 26s are gradually offset in one axial direction, in the order of the magnets lined up in one circumferential direction, as shown in FIG. 10.

A plurality of holes are formed in the intermediate holed steel plates, not shown, similar to the first holed steel plates 28a and the second holed steel plates 28b. None of the magnets 38n, 40n, 38s, and 40s contact the holes of the intermediate holed steel plates. The N-pole and S-pole magnetic poles 26n and 26s have similar structures except for that the magnetization directions are reversed. Therefore, hereinafter the N-pole magnetic pole 26n in particular will be described.

Each N-pole magnetic pole 26n is formed by the magnets 38n and 40n arranged with a V-shaped cross-section. The two magnets 38n and 40n are magnetized such that the same side in the radial direction has the same magnetic property. In this case, with the two magnets 38n and 40n, the magnetization direction of each is the same. With the magnetic poles 26n and 26s that are adjacent in the circumferential direction, the magnetic properties differ. Therefore, the N-pole magnetic pole 26n and the S-pole magnetic pole 26s are arranged alternately in the circumferential direction on the outer peripheral surface of the rotor 12.

The two magnets 38n and 40n that form each magnetic pole 26n are symmetrically arranged on both sides with respect to an inter-magnetic pole plane C1 that passes through the magnetic pole center in the circumferential direction, including the rotational central axis O of the stacked body 24.

A pocket portion 46 that extends farther toward the outside than both side surfaces of the magnets in the circumferential direction are formed on both circumferential end portions of each magnet hole 42. Molten resin to prevent the magnets 38n and 40n from falling out is filled into the pocket portions 46 and solidified. An air gap may be provided instead of filling the pocket portions 46 with resin.

According to the structure described above, of the two magnets 38n and 40n that are adjacent in the circumferential direction at each magnetic pole 26n, the stacked body 24 contacts only one magnet 38n (or 40n) at the same cross-section that is orthogonal to the axial direction of the same position in the axial direction. Therefore, it is possible to prevent eddy currents that are generated in the two magnets at each magnetic pole 26n from short-circuiting via the stacked body 24 and becoming a large eddy current, so eddy current loss can be suppressed.

Here, as a comparative example that differs from the second example embodiment, a structure in which the whole of the magnets 38n and 40n in the axial direction contact the stacked body 24 inside the magnet holes 42 is conceivable. In this comparative example, the directions of the eddy currents viewed from the radial direction of the two magnets 38n and 40n at each magnetic pole 26n are the same. In the comparative example, as shown in FIG. 10, eddy currents α and β generated in the two magnets 38n and 40n short-circuit via the stacked body 24, thereby generating large eddy currents as shown by arrows P2 and P3, and as a result, eddy current loss increases. In the second example embodiment shown in FIGS. 9A, 9B, and 10, one of the two magnets 38n and 40n does not contact the stacked body 24 at the same cross-section of the stacked body 24 at each magnetic pole 26n, so the generation of large eddy currents is able to be inhibited, which in turn enables eddy current loss to be inhibited.

Also, just as with the structure in FIG. 6 described above, neither of the two magnets 40n and 38s that are adjacent in the circumferential direction at the N-pole and the S-pole contact the stacked body 24 inside the hole 44 at the same cross-section of the same position in the axial direction of the stacked body 24. Therefore, short-circuiting of the eddy currents between the two magnets 40n and 38s is also able to be prevented. The other structure and operation is the same as the structure in FIGS. 1 to 7 described above.

Next, a third example embodiment of the invention will be described. Two adjacent magnetic poles 26n and 26s of the rotor 12 of the third example embodiment are shown in the upper part of FIG. 11, and a view corresponding to FIG. 6, of magnets 38n, 40n, 38s, and 40s that form the magnetic poles 26n and 26s is shown in the lower part of FIG. 11. The stacked body 24 is formed by stacking together first holed steel plates 41a, second holed steel plates 41b, third holed steel plates 41c, fourth holed steel plates 41d, and intermediate holed steel plates that are not shown, each of which are provided in plurality. The holed steel plates 41a, 41b, 41c, and 41d each include holes 44 and 45 formed punched out in a V-shape in a plurality of locations in the circumferential direction, similar to the basic structure of the steel plates 41a and 41b in the second example embodiment shown in FIGS. 9A and 9B.

With the first holed steel plates 41a, the distance between inside wall surfaces M1 and M2 on both radial sides of only the hole 44 within which the first magnet 38n is arranged is smaller than it is in the remaining hole 45, such that the first holed steel plates 41a contact only the first magnet 38n, of the magnets 38n, 40n, 38s, and 40s, inside the hole 44. With the second holed steel plates 41b, the distance between inside wall surfaces on both radial sides of only the hole 44 within which the second magnet 40n is arranged is smaller than it is in the remaining hole 45, such that the second holed steel plates 41b contact only the second magnets 40n, of the magnets 38n, 40n, 38s, and 40s, inside the hole 44.

With the third holed steel plates 41c, the distance between inside wall surfaces on both radial sides of only the hole 44 within which the third magnet 38s is arranged is smaller than it is in the remaining hole 45, such that the third holed steel plates 41c contact only the third magnets 38s, of the magnets 38n, 40n, 38s, and 40s, inside the hole 44. With the fourth holed steel plates 41d, the distance between inside wall surfaces on both radial sides of only the hole 44 within which the fourth magnet 40s is arranged is smaller than it is in the remaining hole 45, such that the fourth holed steel plates 41d contact only the fourth magnets 40s, of the magnets 38n, 40n, 38s, and 40s, inside the hole 44.

Figure 11:
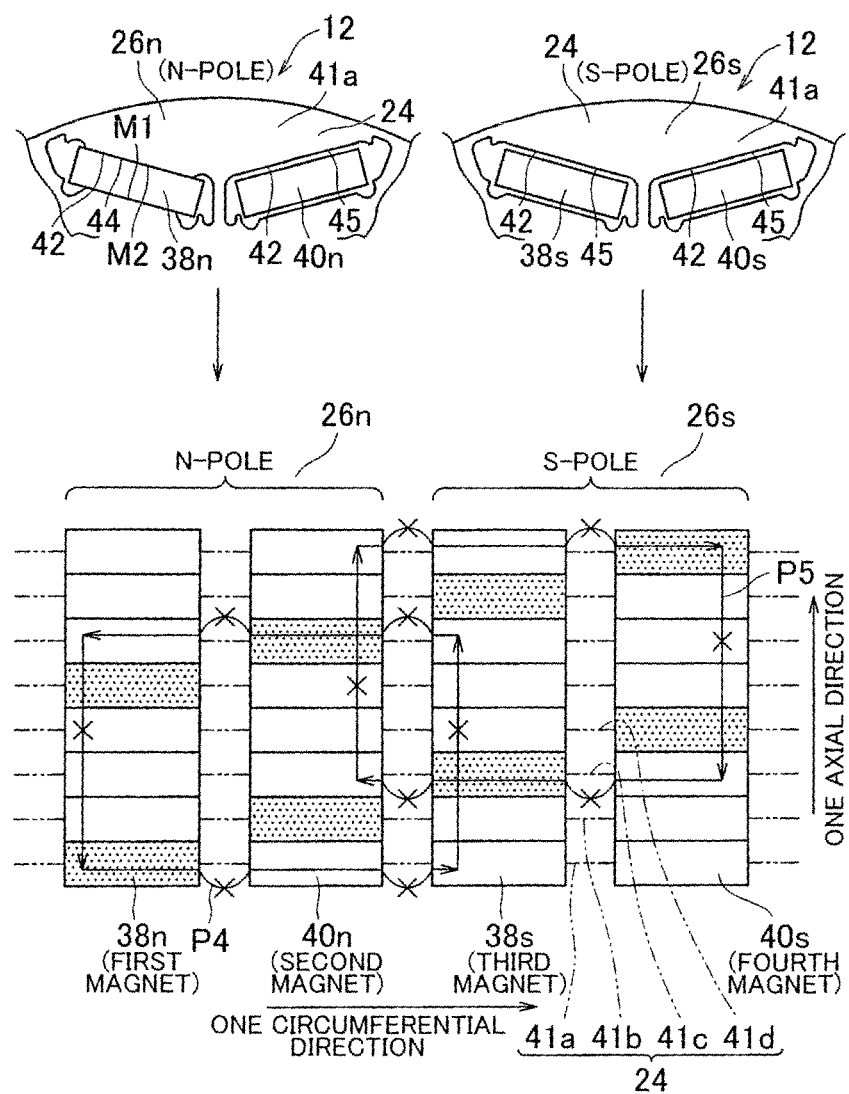
FIG. 11 is a view of a portion of a rotary electric machine rotor according to a third example embodiment of the invention, the upper part of FIG. 11 being a view of two magnetic poles, i.e., an N-pole and an S-pole, that are adjacent, and the lower part of FIG. 11 being a view corresponding to FIG. 6, of the magnets that form these two magnetic poles.

As a result, the positions of contact between the stacked body 24 and the four magnets 38n, 40n, 38s, and 40s arranged at the two magnetic poles 26n and 26s that are adjacent in the circumferential direction are gradually offset in one axial direction, in the order of the magnets lined up in one circumferential direction, as shown in the lower part of FIG. 11.

According to the structure described above, it is possible to inhibit large eddy currents from being generated, as shown by arrows P4 and P5 in the lower part of FIG. 11, that include the N-pole and S-pole magnets 38*n*, 40*n*, 38*s*, and 40*s*. This will be described with reference to FIG. 12.

Figure 12:
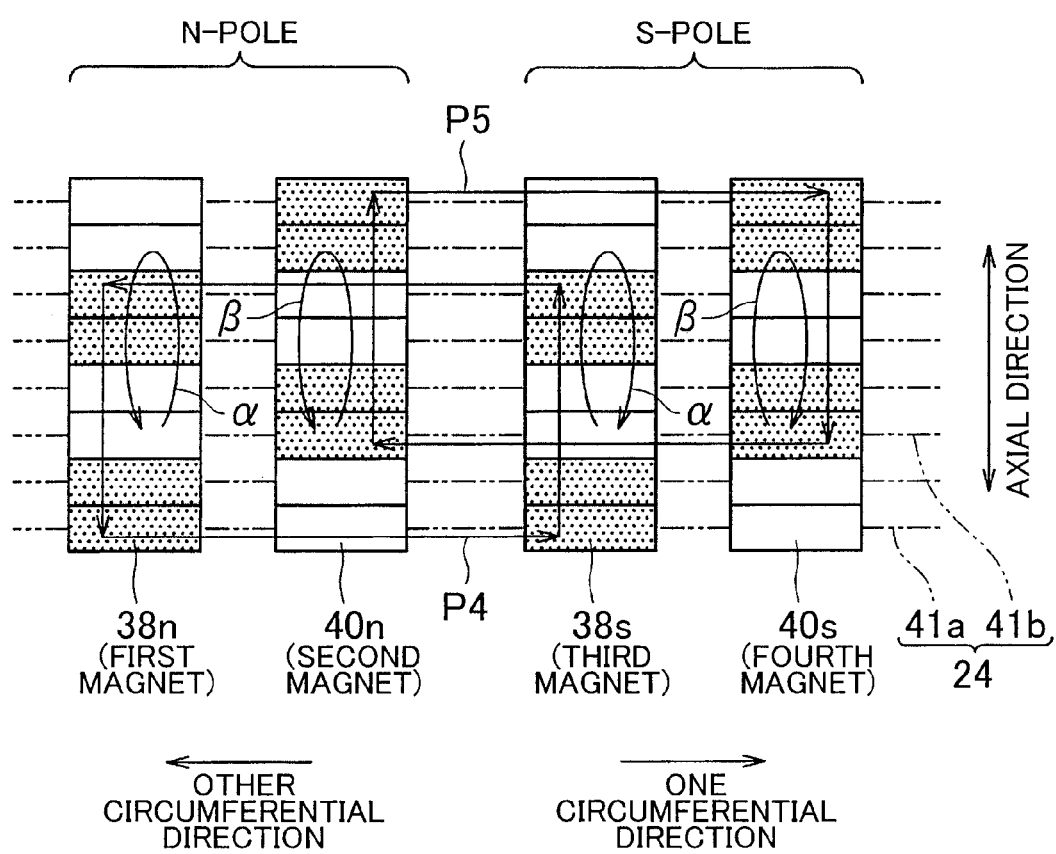
FIG. 12 is a view corresponding to FIG. 6, showing in which large eddy currents that include the N-pole and S-pole magnets are formed in the rotor shown in FIGS. 9A and 9B.

FIG. 12 is a view corresponding to FIG. 6, that shows a state in which large eddy currents are generated that include the N-pole and S-pole magnets 38*n*, 40*n*, 38*s*, and 40*s* in the rotor in FIGS. 9A, 9B, and 10. The first holed steel plates 41*a* contact not only the first magnet 38*n*, but also the third magnet 38*s*, and the second holed steel plates 41*b* contact not only the second magnet 40*n*, but also the fourth magnet 40*s*. In this case, a large eddy current that includes the first magnet 38*n* and the third magnet 38*s* may be generated as shown by arrow P4 in FIG. 12, and a large eddy current that includes the second magnet 40*n* and the fourth magnet 40*s* may be generated as shown by arrow P5. The eddy current indicated by arrow P4 is formed as a result of the effects of i) the direction of the eddy current on the other circumferential side of the first magnet 38*n* being in the opposite axial direction of the direction of the eddy current on the other circumferential side of the third magnet 38*s*, and ii) the direction of the eddy current of the middle second magnet 40*n*. The eddy current indicated by arrow P5 is formed as a result of the effects of i) the direction of the eddy current on the one circumferential side of the second magnet 40*n* being in the opposite axial direction of the direction of the eddy current on the one circumferential side of the fourth magnet 40*s*, and ii) the direction of the eddy current of the middle third magnet 38*s*. With the structures in FIGS. 9A and 9B as well, if the first magnet 38*n* is far away from the third magnet 38*s*, and the second magnet 40*n* is far away from the fourth magnet 40*s*, large eddy currents that include these will not be formed. This third example embodiment is effective in that it enables large eddy currents to be suppressed when the distance between the first magnet 38*n* and the third magnet 38*s*, and the distance between the second magnet 40*n* and the fourth magnet 40*s*, is small. The other structure and operation is similar to the structure in FIGS. 9A, 9B, and 10.

Figure 13A:
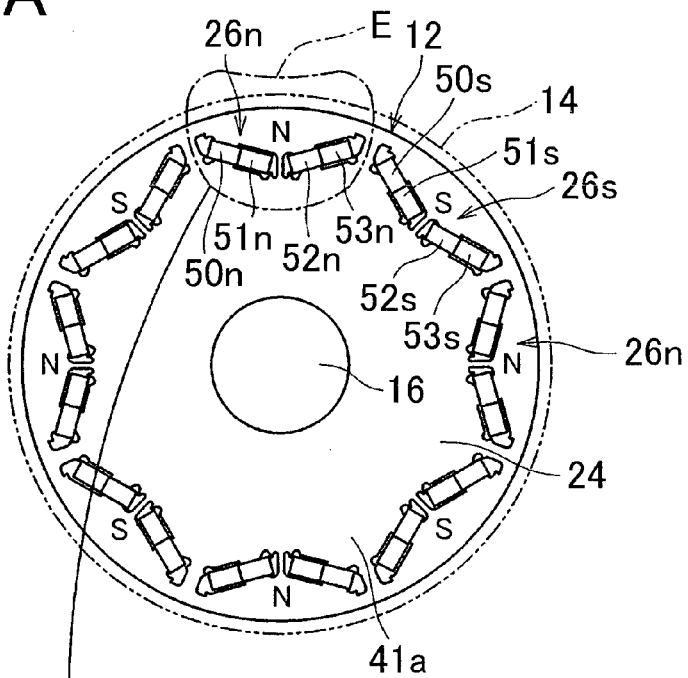
FIG. 13A is an axial end surface view of a rotary electric machine rotor according to a fourth example embodiment of the invention.
Figure 13B:
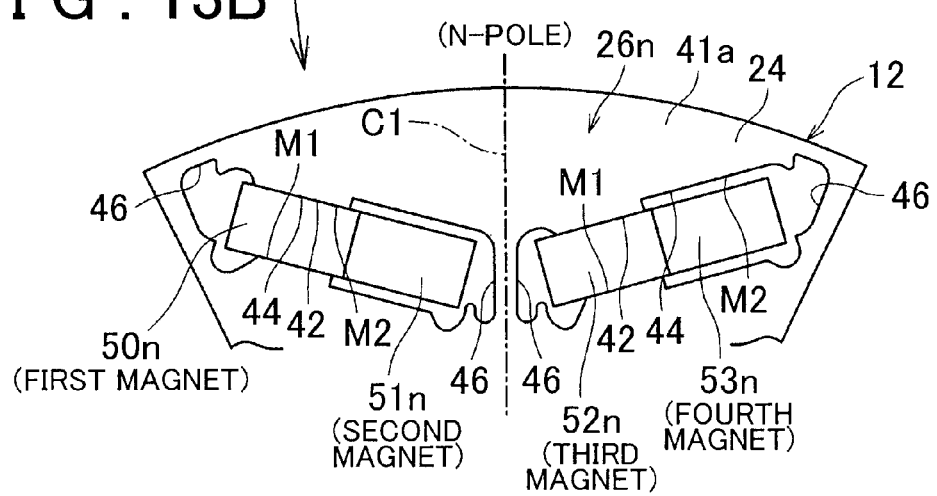
FIG. 13B is an enlarged view of portion E in FIG. 13A.
Figure 14:
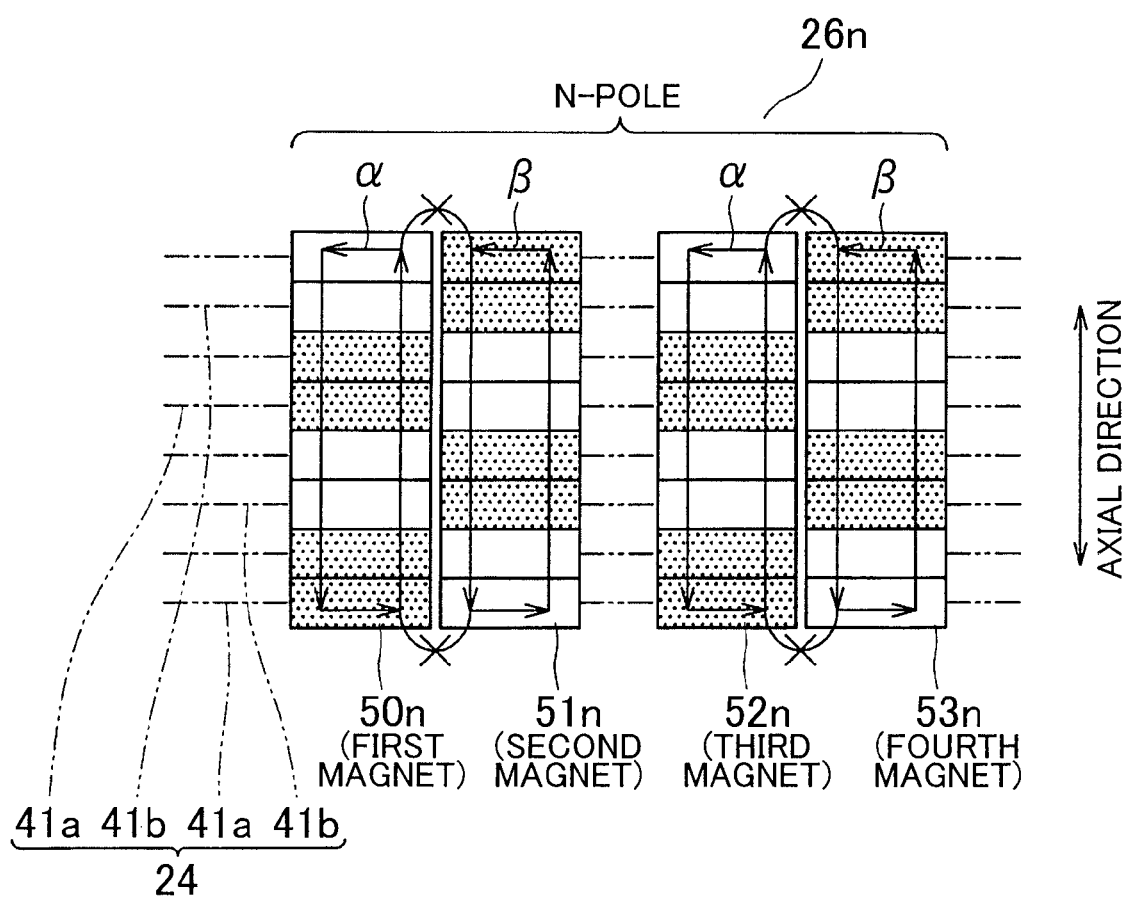
FIG. 14 is a view corresponding to FIG. 6, of N-pole magnets shown in FIGS. 13A and 13B.

Next, a fourth example embodiment of the invention will be described. An axial end surface view of the rotor 12 according to the fourth example embodiment is shown in FIG. 13A, and an enlarged view of portion E shown in the upper part of FIG. 13A is shown in FIG. 13B. FIG. 14 is a view corresponding to FIG. 6, of N-pole magnets 50*n*, 51*n*, 52*n*, and 53*n* shown in FIGS. 13A and 13B. The rotor 12 in this fourth example embodiment includes N-pole magnets 50*n*, 51*n*, 52*n*, and 53*n*, and S-pole magnets 50*s*, 51*s*, 52*s*, and 53*s* arranged in the magnet holes 42 of the stacked body 24, in the structure in FIG. 10. The S-pole magnets 50*s*, 51*s*, 52*s*, and 53*s* include a first magnet 50*n* and a third magnet 52*n* that are each one magnet arranged in two magnet holes 42 that are adjacent in the circumferential direction, and a second magnet 51*n* and a fourth magnet 53*n* that are each another magnet arranged in the two magnet holes 42. The second magnet 51*n* and the fourth magnet 53*n* are arranged next to the first magnet 50*n* and the third magnet 52*n*, respectively, in the circumferential direction.

The S-pole magnets 50*s*, 51*s*, 52*s*, and 53*s* include a fifth magnet 50*s* and a seventh magnet 52*s* that are each one magnet arranged in two magnet holes 42 that are adjacent in the circumferential direction, and a sixth magnet 51*s* and an eighth magnet 53*s* that are each another magnet arranged in the two magnet holes 42. The sixth magnet 51*s* and the eighth magnet 53*s* are arranged next to the fifth magnet 50*s* and the seventh magnet 52*s*, respectively, in the circumferential direction. Magnets that are adjacent in the circumferential direction inside the magnet holes 42 (e.g., 50*n* and 51*n*) are magnets that are adjacent and closest together in the circumferential direction of the plurality of magnets.

The magnets are referred to as split magnets, and when split into two from a single magnet 38*n*, 40*n*, 38*s*, and 40*s* shown in FIGS. 9A and 9B, are arranged as separate members having the same magnetic properties as the split magnets, respectively. As a result, the effect of inhibiting eddy current loss due to the eddy current of each magnet becoming smaller is improved compared with a structure without a split magnet, such as that shown in FIG. 11. The N-pole and S-pole magnetic poles 26*n* and 26*s* have a similar structure except for that the magnetization directions are reversed. Hereinafter, the N-pole magnet 26*n* in particular will be described.

As shown in FIG. 14, with the first holed steel plates 41*a*, the distance between inside wall surfaces M1 and M2 on both radial sides at the portions of the hole 44 where the first magnet 50*n* and the third magnet 52*n* are arranged is smaller than it is at the portions where the remaining magnets are arranged. The first holed steel plates 41*a* contact the first magnet 50*n* and the third magnet 52*n* inside the hole 44, but do not contact the remaining magnets 51*n* and 53*n*.

In FIGS. 13A, 13B, and 14, the contact relationship between the stacked body 24 and the S-pole magnets 50*s*, 51*s*, 52*s*, and 53*s* is not shown, but is similar to that of the N-pole.

With the second holed steel plates 41*b*, the distance between inside wall surfaces M1 and M2 on both radial sides at the portions of the hole 44 where the second magnet 51*n* and the fourth magnet 53*n* are arranged is smaller than it is at the portions where the remaining magnets are arranged. The second holed steel plates 41*b* contact the second magnet 51*n* and the fourth magnet 53*n* inside the hole 44, but do not contact the remaining magnets 50*n* and 52*n*.

A plurality of holes are formed in the intermediate holed steel plates, not shown, similar to the first holed steel plates 41*a* and the second holed steel plates 41*b*. None of the N-pole and S-pole magnets contact the holes of the intermediate holed steel plates. The contact relationship between the stacked body 24 and the magnets arranged in the magnet holes 42 on both sides is the same, so hereinafter the contact relationship between the stacked body 24 and the first magnet 50*n*, and the second magnet 51*n* will be described.

According to this structure, the stacked body 24 contacts only one magnet 50*n* (or 51*n*) of the two magnets 50*n* and 51*n* that are adjacent in the circumferential direction at the magnet holes 42, at the same cross-section orthogonal to the axial direction of the same position in the axial direction. Eddy currents generated in the two magnets 50*n* and 51*n* in the magnet holes 42 are able to be prevented from short-circuiting via the stacked body 24, and thus becoming large eddy currents, for the same reason that short-circuiting of the eddy currents of the two magnets 38*n* and 40*n* arranged in the N-pole magnetic pole 26*n* in the structure in. FIG. 10 is able to be inhibited. Thus, eddy current loss is able to be suppressed. The two magnets 50*n* and 51*n* are arranged next to each other, but an oxide coating is provided on the surfaces of the magnets 50*n* and 51*n*, and it is unlikely to be damaged by edge contact between the two magnets 50*n* and 51*n*, so the eddy currents will not short-circuit via the contact portions between the two magnets 50*n* and 51*n*, and thus large eddy currents will effectively not be generated.

The other structure and operation is the same as the structure shown in FIGS. 9A, 9B, and 10.

Figure 15:
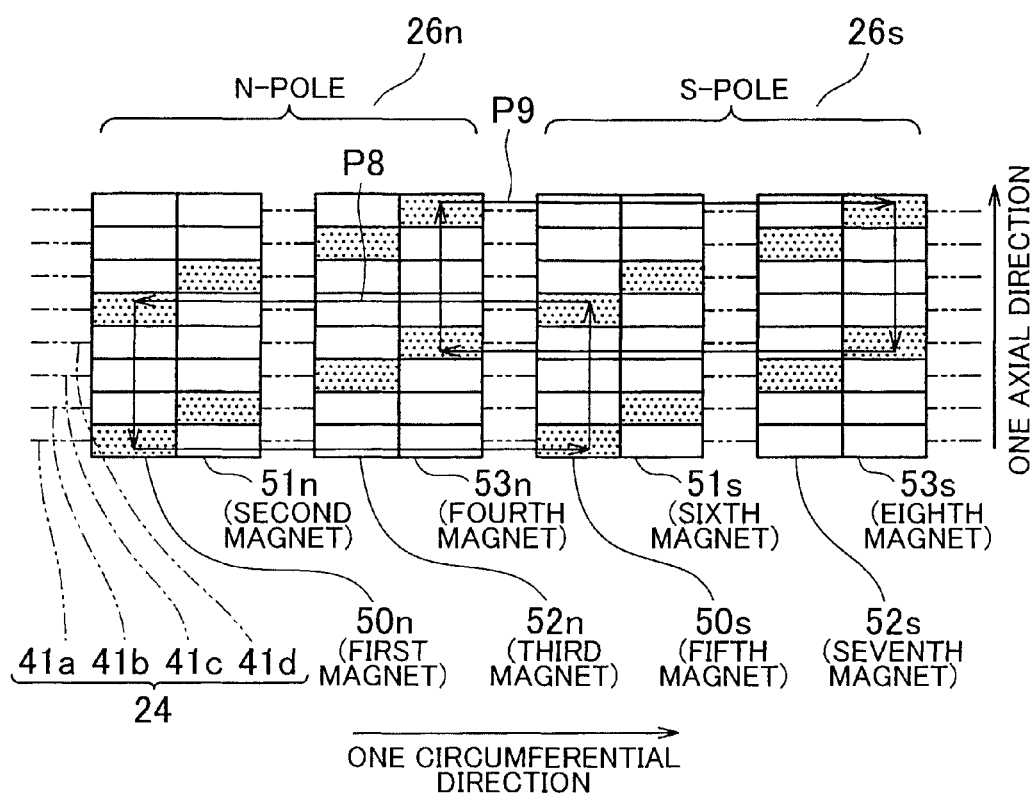
FIG. 15 is a view corresponding to FIG. 6, of N-pole and S-pole magnets in a rotary electric machine rotor according to a fifth example embodiment of the invention.
Figure 16:
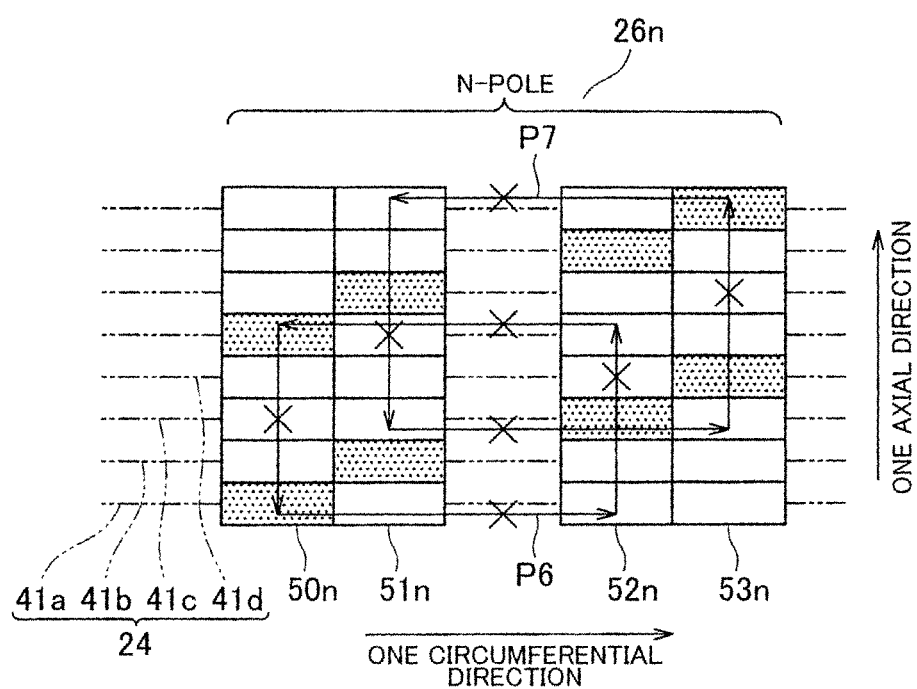
FIG. 16 is a frame format showing a contact state between the stacked body and the N-pole magnets in FIG. 15.

Next, a fifth example embodiment of the invention will be described. FIG. 15 is a view corresponding to FIG. 6, of N-pole magnets 50n, 51n, 52n, and 53n and S-pole magnets 50s, 51s, 52s, and 53s in a rotor according to the fifth example embodiment. FIG. 16 is a view showing a frame format of a contact state between the stacked body 24 and the N-pole magnets 50n, 51n, 52n, and 53n in FIG. 15.

The stacked body 24 is formed by stacking together first holed steel plates 41a, second holed steel plates 41b, third holed steel plates 41c, fourth holed steel plates 41d, and intermediate holed steel plates that are not shown, each of which are provided in plurality. The holed steel plates 41a, 41b, 41c, and 41d each include holes 44 formed punched out in a V-shape in a plurality of locations in the circumferential direction, similar to the basic structure of the steel plates 28a and 28b in the fourth example embodiment shown in FIG. 13. The N-pole and S-pole magnetic poles 26n and 26s have similar structures except for that the magnetization directions are reversed. Therefore, hereinafter the N-pole magnetic pole 26n in particular will be described.

With the first holed steel plates 41a, the distance between inside wall surfaces on both radial sides only at the portion of the hole 44 where the first magnet 50n is arranged is smaller than it is at the remaining portion of the hole 44. The first holed steel plates 41a contact the first magnet 50n inside the hole 44, but do not contact the remaining magnets of the N-pole magnetic pole 26n. With the second holed steel plates 41b, the distance between inside wall surfaces on both radial sides only at the portion of the hole 44 where the second magnet 51n is arranged is smaller than it is at the remaining portion of the hole 44. The second holed steel plates 41b contact the second magnet 51n inside the hole 44, but do not contact the remaining magnets of the N-pole magnetic pole 26n.

With the third holed steel plates 41c, the distance between inside wall surfaces on both radial sides only at the portion of the hole 44 where the third magnet 52n is arranged is smaller than it is at the remaining portion of the hole 44. The third holed steel plates 41c contact the third magnet 52n inside the hole 44, but do not contact the remaining magnets of the N-pole magnetic pole 26n. With the fourth holed steel plates 41d, the distance between inside wall surfaces on both radial sides only at the portion of the hole 44 where the fourth magnet 53n is arranged is smaller than it is at the remaining portion of the hole 44. The fourth holed steel plates 41d contact the fourth magnet 53n inside the hole 44, but do not contact the remaining magnets.

As a result, the positions of contact between the stacked body 24 and the four magnets 50n, 51n, 52n, and 53n arranged at the N-pole magnetic pole 26n are gradually offset in one axial direction, in the order of the magnets lined up in one circumferential direction, as shown in FIGS. 15 and 16.

According to the structure described above, it is possible to inhibit large eddy currents from being generated in the directions indicated by arrows P6 and P7 in FIG. 16, that include two magnets arranged one on each side in the circumferential direction sandwiching one magnet, at each magnetic pole 26n. This will be described with reference to FIG. 17.

Figure 17:
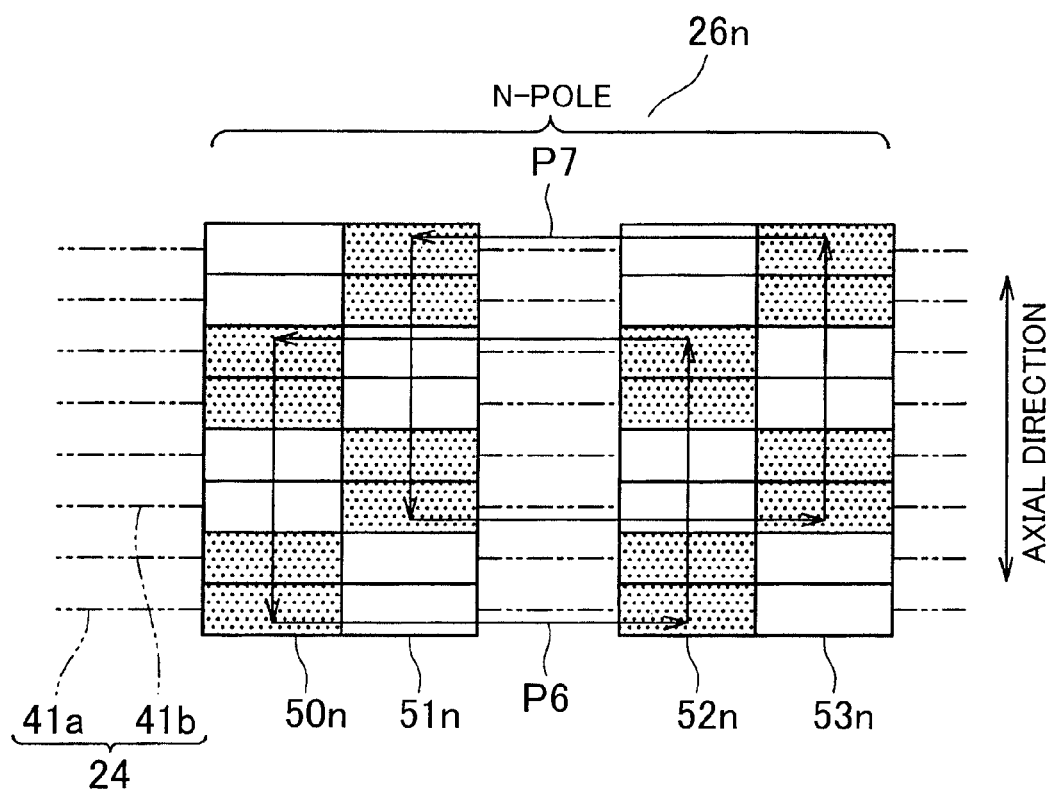
FIG. 17 is a view corresponding to FIG. 6, showing a state in which large eddy currents are formed, in the rotor shown in FIGS. 13A and 13B.

FIG. 17 is a view corresponding to FIG. 6, that shows a state in which large eddy currents are generated that include the magnets of the N-pole of the rotor 12 in the fourth example embodiment shown in FIGS. 13A, 13B, and 14. The first holed steel plates 28a contact not only the first magnet 50n, but also the third magnet 52n, at the N-pole, and the second holed steel plates 28b contact not only the second magnet 51n, but also the fourth magnet 53n, at the N-pole. In this case, a large eddy current that includes the first magnet 50n and the third magnet 52n may be generated as shown by arrow P6, and a large eddy current that includes the second magnet 5in and the fourth magnet 53n may be generated as shown by arrow P7. With the structures in FIGS. 13A and 13B as well, if the first magnet 50n is far away from the third magnet 52n, and the second magnet 51n is far away from the fourth magnet 53n, large eddy currents that include these will not be formed. This fifth example embodiment is effective in that it enables large eddy currents to be suppressed when the distance between the first magnet 50n and the third magnet 52n, and the distance between the second magnet 51n and the fourth magnet 53n, is small. The other structure and operation is similar to the structure in FIGS. 13A, 13B, and 14.

Next, a sixth example embodiment of the invention will be described. Two adjacent magnetic poles 26n and 26s of the rotor 12 according to the sixth example embodiment are shown in the upper part of FIG. 18, and magnets that form the two magnetic poles 26n and 26s are shown in a view corresponding to FIG. 6, in the lower part of FIG. 18. The stacked body 24 is formed by stacking together first holed steel plates 41a, second holed steel plates 41b, third holed steel plates 41c, fourth holed steel plates 41d, fifth holed steel plates 41e, sixth holed steel plates 41f, seventh holed steel plates 41g, eighth holed steel plates 41h, and intermediate holed steel plates that are not shown, each of which are provided in plurality. The holed steel plates 41a to 41h each include a hole 44 formed punched out in a V-shape in a plurality of locations in the circumferential direction, similar to the basic structure of the steel plates 41a and 41b in FIGS. 13A, 13B, and 14.

With the first holed steel plates 41a, the distance between wall surfaces on both radial sides at the portions of the hole 44 where the first magnet 50n is arranged is smaller than it is at the portions where the remaining magnets are arranged, such that the first holed steel plates 41a contact only the first magnet 50n inside the hole 44. With the second holed steel plates 41b, the distance between wall surfaces on both radial sides at the portions of the hole 44 where the second magnet 51n is arranged is smaller than it is at the portions where the remaining magnets are arranged, such that the second holed steel plates 41b contact only the second magnet 51n inside the hole 44. With the fourth holed steel plates 41d to the eighth holed steel plates 41h as well, in the same way, the distance between wall surfaces on both radial sides at the portions of the hole 44 where one of the third magnet 52n to the eighth magnet 53s of the two magnetic poles 26n and 26s is arranged is smaller than it is at the portions where the remaining magnets are arranged, such that the fourth holed steel plates 41d to the eighth holed steel plates 41h contact only the third magnet 52n to the eighth magnet 53s, respectively.

Figure 18:
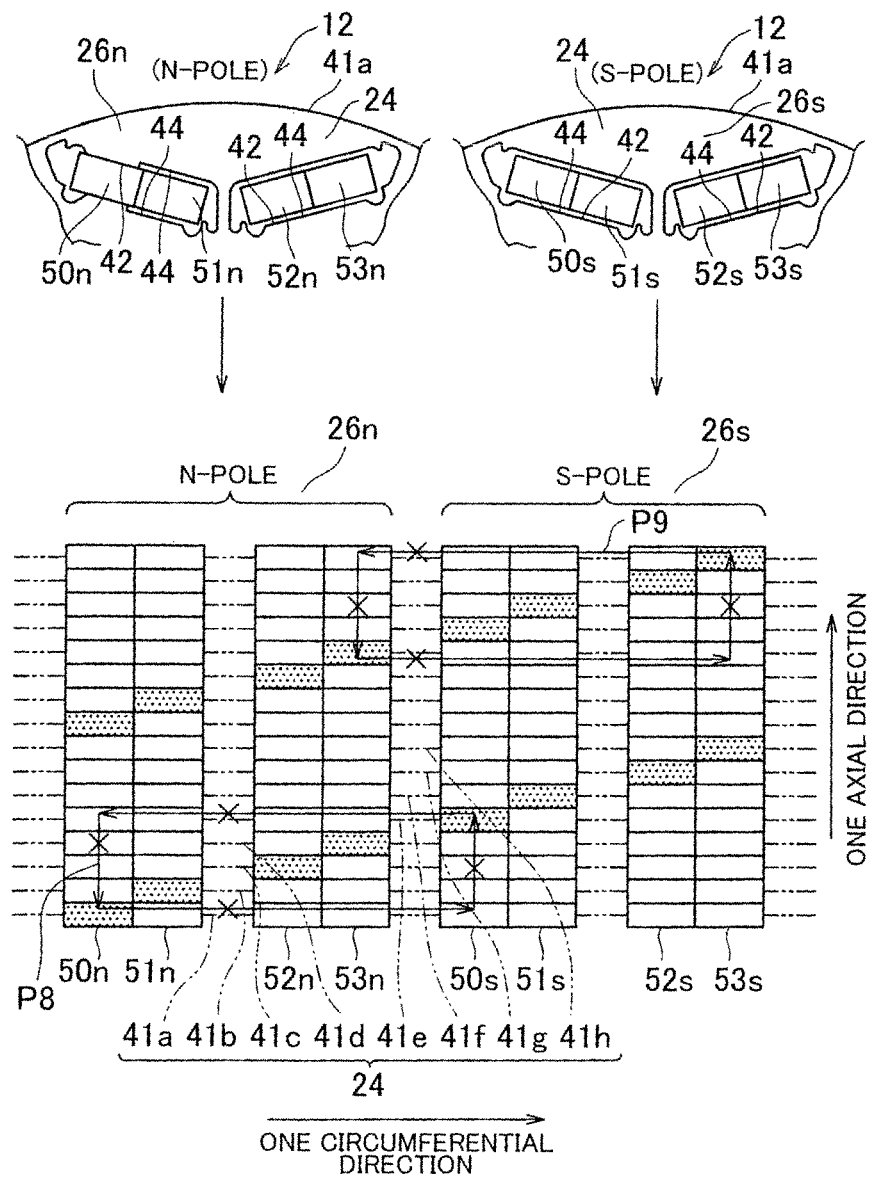
FIG. 18 is a view of a portion of a rotary electric machine rotor according to a sixth example embodiment of the invention, the upper part of FIG. 18 being a view of two magnetic poles, i.e., an N-pole and an S-pole, that are adjacent, and the lower part of FIG. 18 being a view corresponding to FIG. 6, of the magnets that form these two magnetic poles.

As a result, the positions of contact between the stacked body 24 and the eight magnets 50n, 51n, 52n, 53n, 50s, 51s, 52s, and 53s arranged at the magnetic poles 26n and 26s are gradually offset in one axial direction, in the order of the magnets lined up in one circumferential direction, as shown in the upper part of FIG. 18.

According to the structure described above, it is possible to inhibit large eddy currents from being generated in the directions indicated by arrows P8 and P9 in the lower part of FIG. 18, that include two magnets arranged one on each side in the circumferential direction sandwiching a plurality of magnets, in the rotor 12. This will be described referring back to FIG. 15.

With the rotor 12 in FIG. 15, one holed steel plate 41a, 41b, 41c, and 41d contacts both of the N-pole and S-pole magnets. In this case, a large eddy current that includes the first magnet 50n and the fifth magnet 50s may be generated, as indicated by arrow P8 in FIG. 15, and a large eddy current that includes the fourth magnet 53n and the eighth magnet 53s may be generated, as indicated by arrow P9 in FIG. 15. With the structure, in FIG. 15 as well, if the first magnet 50n is far away from the fifth magnet 50s, and the fourth magnet 53n is far away from the eighth magnet 53s, large eddy currents that include these will not be formed. This sixth example embodiment is effective in that it enables large eddy currents to be suppressed when the distance between the first magnet 50n and the fifth magnet 50s, and the distance between the fourth magnet 53n and the eighth magnet 53s, is small. The other structure and operation is similar to the structure in FIGS. 15 and 16.

Figure 19:
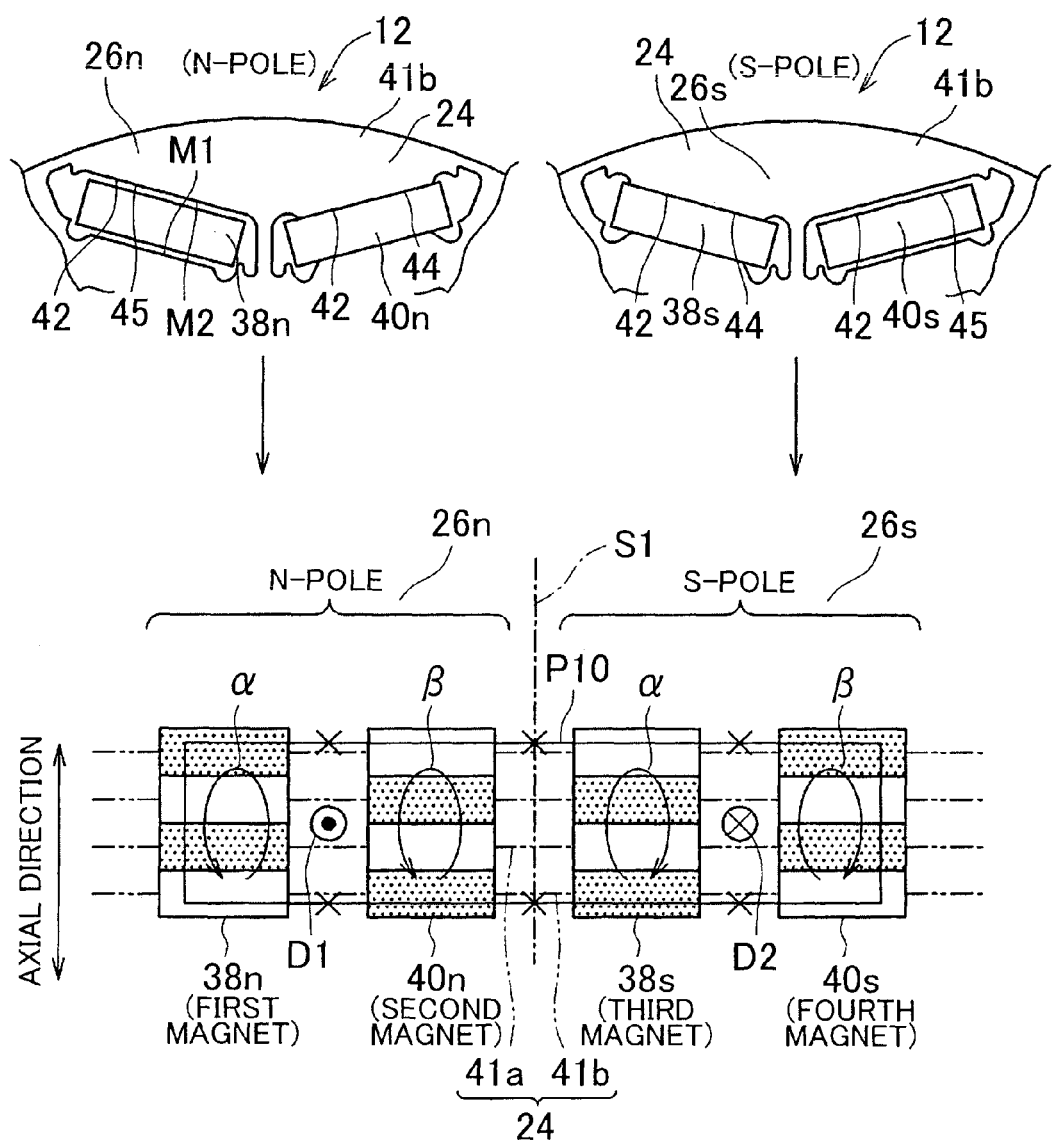
FIG. 19 is a view of a portion of a rotary electric machine rotor according to a seventh example embodiment of the invention, the upper part of FIG. 19 being a view of two magnetic poles, i.e., an N-pole and an S-pole, that are adjacent, and the lower part of FIG. 19 being a view corresponding to FIG. 6, of the magnets that form these two magnetic poles.

Next, a seventh example embodiment of the invention will be described. A view shown in the lower part of FIG. 19 is a view that corresponds to FIG. 6, of magnets that form two adjacent magnetic poles 26n and 26s of the rotor 12 according to the seventh example embodiment. With the rotor 12 in the seventh example embodiment, the stacked body 24 is formed by first holed steel plates 41a, second holed steel plates 41b, and intermediate holed steel plates that are not shown, each provided in plurality in the structure shown in FIG. 11.

With the first holed steel plates 41a, the distance between wall surfaces on both radial sides of only the hole 44 where the first magnet 38n and the fourth magnet 40s are arranged is smaller than it is in the remaining hole 44. As a result, the first holed steel plates 41a contact, inside the hole 44, the first magnet 38n and the fourth magnet 40s symmetrically with respect to an inter-magnetic pole plane S1 that passes through the center of the two magnetic poles, including the rotational central axis O of the stacked body 24, but do not contact the second magnet 40n and the third magnet 38s. The third magnet 38s and the fourth magnet 40s are a second one magnet and a second other magnet, respectively, arranged adjacent in the circumferential direction at the S-pole magnetic pole 26s that is the second magnetic pole.

With the second holed steel plates 41b, the distance between wall surfaces on both radial sides of only the hole 44 where the second magnet 40n and the third magnet 38s are arranged is smaller than it is in the remaining hole 44. As a result, the second holed steel plates 41b contact, inside the hole 44, the second magnet 40n and the third magnet 38s symmetrically with respect to the inter-magnetic pole plane S1, but do not contact the first magnet 38n and the fourth magnet 40s.

Accordingly, the positions of contact between the stacked body 24 and the plurality of magnets 38n, 40n, 38s, and 40s at the two magnetic poles 26n and 26s are symmetrically arranged with respect to the inter-magnetic pole plane S1.

According to the structure described above, it is possible to suppress large eddy currents that include the N-pole and S-pole magnets from being generated, and reduce the separation number in the axial direction of the contact portions necessary to suppress the eddy currents.

With the structure in FIG. 19, eddy currents such as those indicated by arrows α and β are generated in the magnets of the magnetic poles 26n and 26s. In this case, main magnetic fluxes that are included in the rotating magnetic field of the stator 14 and act on the rotor 12 flow from one of the adjacent magnetic poles 26n and 26s to the other, and the main magnetic fluxes pass in opposite directions in the radial direction at positions indicated by D1 and D2. In this case as well, the positions of contact in the axial direction between the stacked body 24 and the first magnet 38n and the third magnet 38s are offset, so a large eddy current that includes the first magnet 38n and the third magnet 38s will not be generated. Also, the positions of contact in the axial direction between the stacked body 24 and the second magnet 40n and the fourth magnet 40s are also offset, so a large eddy current that includes the second magnet 40n and the fourth magnet 40s will not be generated. The positions of contact in the axial direction between the stacked body 24 and the first magnet 38n and the fourth magnet 40s, and stacked body 24 and the second magnet 40n and the third magnet 38s are the same, but the positions of contact are symmetrical with respect to the inter-magnetic pole plane S1, so the eddy currents generated in the stacked body 24 at the two magnetic poles 26n and 26s cancel each other out because they are in opposite directions at the same level. Therefore, a large eddy current is able to be prevented from being generated in a direction along frame P10 in the view shown in the lower part of FIG. 19. Also, the separation number in the axial direction of the contact portion between the stacked body 24 and the magnets is able to be reduced, so the work of stacking the holed steel plates 41a and 41b while changing the type or circumferential position thereof is reduced, which improves the assembling workability of the stacked body 24. The other, structure and operation is the same as the structure in FIG. 11.

Figure 20:
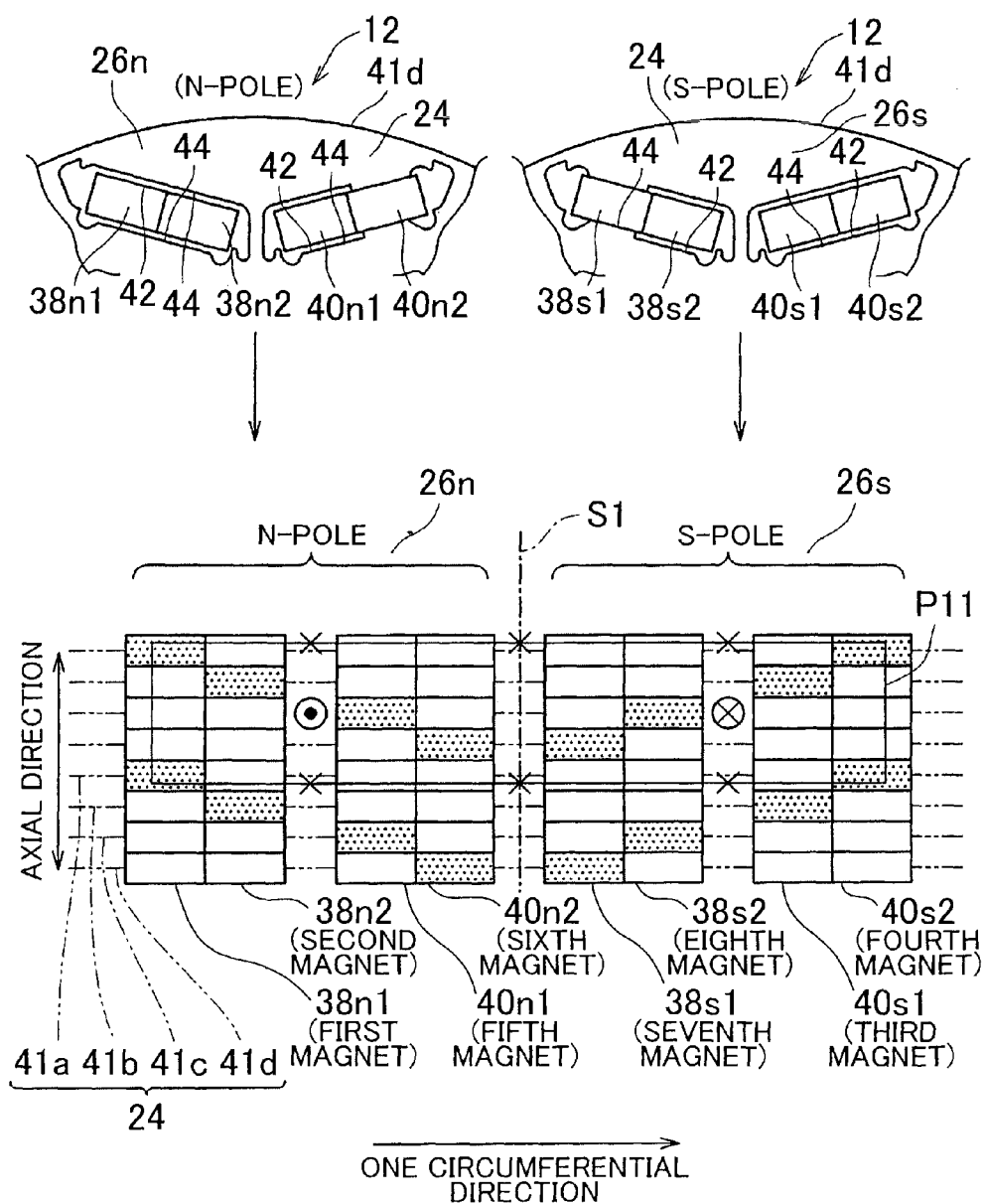
FIG. 20 is a view of a portion of a rotary electric machine rotor according to an eighth example embodiment of the invention, with the upper part of FIG. 20 being a view of two magnetic poles, i.e., an N-pole and an S-pole, that are adjacent, and the lower part of FIG. 20 being a view corresponding to FIG. 6, of the magnets that form these two magnetic poles.

Next, an eighth example embodiment of the invention will be described. FIG. 20 is a view corresponding to FIG. 6, of magnets that form two adjacent magnetic poles 26n and 26s in the rotor 12 of the eighth example embodiment. In the rotor 12 of the eighth example embodiment, the stacked body 24 is formed by first holed steel plates 41a, second holed steel plates 41b, third holed steel plates 41c, fourth holed steel plates 41d, and intermediate holed steel plates that are not shown, each provided in plurality, in the structure shown in FIG. 18.

The plurality of magnets includes a first magnet 38n1, a second magnet 38n2, a third magnet 40s1, a fourth magnet 40s2, a fifth magnet 40n1, a sixth magnet 40n2, a seventh magnet 38s1, and an eighth magnet 38s2. The first magnet 38n1 and the second magnet 38n2 are arranged next to the outside of the N-pole magnetic pole 26n of the two magnetic poles 26n and 26s. The third magnet 40s1 and the fourth magnet 40s2 are arranged next to the outside of the S-pole magnetic pole 26s of the magnetic poles 26n and 26s.

The fifth magnet 40n1 and the sixth magnet 40n2 are arranged next to the inside of the N-pole magnetic pole 26n of the magnetic poles 26n and 26s. The seventh magnet 38s1 and the eighth magnet 38s2 are arranged next to the inside of the S-pole magnetic pole 26s of the magnetic poles 26n and 26s.

The arrangement relationship of the first magnet 38n1 to the eighth magnet 38s2 differs from the arrangement relationship of the first magnet 50n to the eighth magnet 53s in FIG. 18, but the polarity of the magnets in FIG. 20 that are arranged in the same positions as the magnets in FIG. 18 are the same as they are in FIG. 18. Hereinafter, the two adjacent magnetic poles 26n and 26s will be described.

With the first holed steel plates 41a, the distance between wall surfaces on both radial sides at only the portions of the hole 44 where the first magnet 38n1 and the fourth magnet 40s2 are arranged is smaller than it is at the remaining portions of the hole 44. The first holed steel plates 41a contact the first magnet 38n1 and the fourth magnet 40s2 inside the hole 44 symmetrically with respect to the inter-magnetic pole plane S1, but do not contact the remaining magnets.

With the second holed steel plates 41b, the distance between wall surfaces on both radial sides at only the portions of the hole 44 where the second magnet 38n2 and the third magnet 40s1 are arranged is smaller than it is at the remaining portions of the hole 44. The second holed steel plates 41b contact the second magnet 38n2 and the third magnet 40s1 inside the hole 44 symmetrically with respect to the inter-magnetic pole plane S1, but do not contact the remaining magnets.

With the third holed steel plates 41c, the distance between wall surfaces on both radial sides at only the portions of the hole 44 where the fifth magnet 40n1 and the eighth magnet 38s2 are arranged is smaller than it is at the remaining portions of the hole 44. The third holed steel plates 41c contact the fifth magnet 40n1 and the eighth magnet 38s2 inside the hole 44 symmetrically with respect to the inter-magnetic pole plane S1, but do not contact the remaining magnets.

With the fourth holed steel plates 41d, the distance between wall surfaces on both radial sides at only the portions of the hole 44 where the sixth magnet 40n2 and the seventh magnet 38s1 are arranged is smaller than it is at the remaining portions of the hole 44. The fourth holed steel plates 41d contact the sixth magnet 40n2 and the seventh magnet 38s1 inside the hole 44 symmetrically with respect to the inter-magnetic pole plane S1, but do not contact the remaining magnets.

As a result, the positions of contact between the stacked body 24 and the plurality of magnets 38n1, 38n2, 40s1, 40s2, 40n1, 40n2, 38s1, and 38s2 at the two magnetic poles 26n and 26s are symmetrically arranged on both sides of the inter-magnetic pole plane S1.

According to the structure described above, the contact positions of the fifth magnet 40n1, the sixth magnet 40n2, the seventh magnet 38n1, and the eighth magnet 38s2 with respect to the stacked body 24 are also symmetrical with respect to the inter-magnetic pole plane S1, in the structure in FIG. 19. Therefore, for the same reasons given for the structure in FIG. 19, large eddy currents are inhibited from being generated in a direction along frame P11, and the separation number in the axial direction of the contact portions necessary to inhibit eddy currents is able to be reduced. The other structure and operation are the same as that of the structure in FIG. 18.

Figure 21:
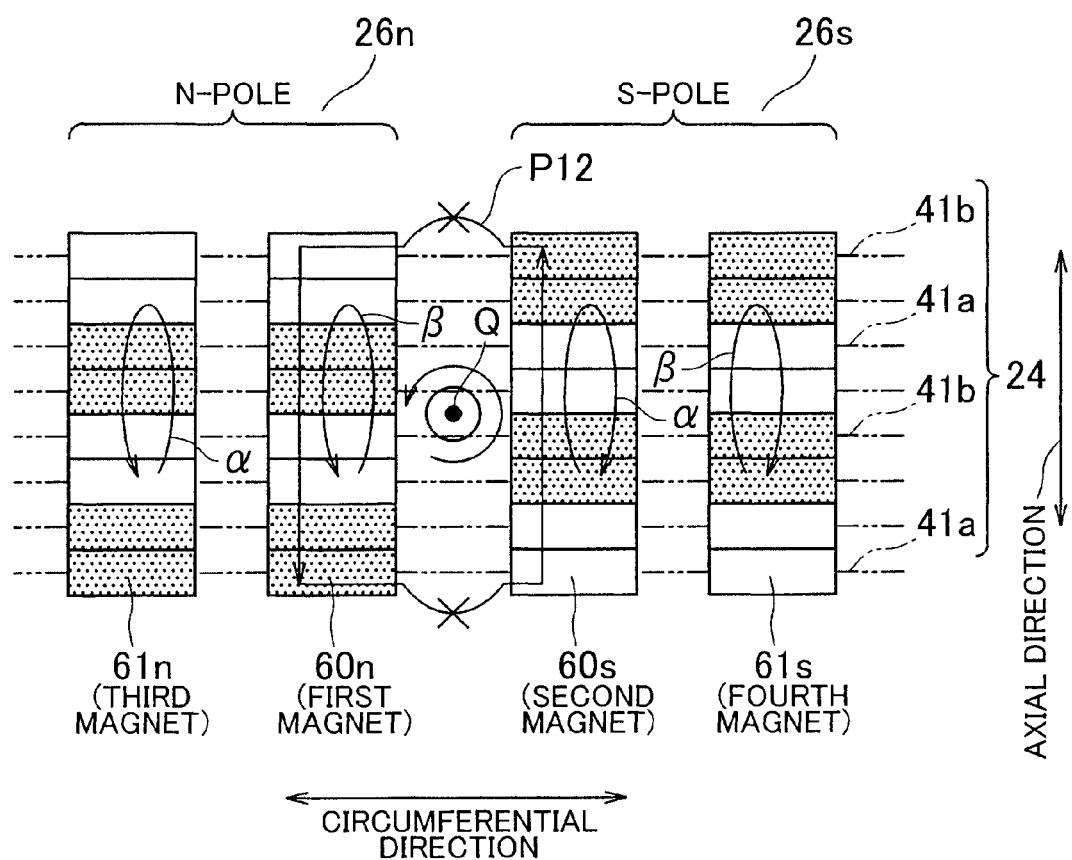
FIG. 21 is a view corresponding to FIG. 6, of N-pole and S-pole magnets in a rotary electric machine rotor according to a ninth example embodiment of the invention.

Next, a ninth example embodiment of the invention will be described. FIG. 21 is a view corresponding to FIG. 6, of N-pole and S-pole magnets in a rotary electric machine rotor according to the ninth example embodiment. In the rotor of this ninth example embodiment, the first holed steel plates 41a having the structure in FIGS. 9A and 9B to FIG. 10 contacts a first magnet 60n and a third magnet 61n of the N-pole, but does not contact a second magnet 60s or a fourth magnet 61s of the S-pole. The second holed steel plates 41b contacts the second magnet 60s and the fourth magnet 61s of the S-pole, but does not contact the first magnet 60n or the third magnet 61n of the N-pole.

The arrangement relationship of the first magnet 60n to the fourth magnet 61s differs from the arrangement relationship of the first magnet 38n to the fourth magnet 40s in FIGS. 9A and 9B, but the polarities of the magnets arranged in the same positions as the magnets in FIGS. 9A and 9B are the same as they are in FIGS. 9A and 9B.

With the structure described above, the steel plates contacted by the magnets of the magnetic poles 26n and 26s that are closest in the circumferential direction, from among the plurality of magnets 60n, 61n, 60s, and 61s, are the same. The steel plates contacted by the two adjacent magnets 60n and 60s at the N-pole and the S-pole are different. As a result, while there is a possibility that eddy currents generated by the magnets of the same magnetic pole may short-circuit and become large, eddy currents generated by two adjacent magnets at the N-pole and the S-pole are able to be inhibited from short-circuiting for the same reason as that described with reference to FIG. 6. As a result, a large eddy current is able to be inhibited from being generated in the direction indicated by arrow P12.

While the invention has been described with reference to specific embodiments thereof, the invention is not limited to these example embodiments, but may be carried out in any of a variety of modes without departing from the scope thereof.

For example, in the description above, there are two different hole shapes in the holed steel plates, but the first holed steel plate may contact one magnet but not another magnet, and the second holed steel plate may contact the other magnet but not the one magnet, by making the sectional shape orthogonal to the axial direction of the magnets different at a first position in the axial direction than it is at a second position in the axial direction. For example, the sectional shape of the first magnet may be made large at a first position in the axial direction and small at a second position in the axial direction, and the sectional shape of the second magnet may be made small at the first position and large at the second position. In this case, the hole shapes in the holed steel plates may all be the same.

Also, in the description above, the stacked body is formed by stacking a plurality of disc-like steel plates, together, but the stacked body may also be a so-called split-core stacked body in which a plurality of split elements that are split in the circumferential direction are connected in an annular shape, and the stacked body is formed by stacking a plurality of steel plates made of the split elements together.

Also, in the description above, the magnets have an oxide coating formed on their surface, but magnets without an oxide coating may also be used. In this case, when a plurality of magnets are arranged next to one another in a single hole, a gap is preferably provided between the plurality of magnets so that they do not contact one another.

Also, the contact portion between the holed steel plates and the magnets is not limited to planar contact. That is, the contact portion may also be a linear or a point-like contact portion.

The invention claimed is:

1. A rotary electric machine rotor comprising:
   a plurality of magnets; and
   a stacked body in which a plurality of holed steel plates provided with holes punched out of insulation coated steel plates are stacked together, the stacked body including a plurality of magnet holes each of which is provided by the plurality of holes being connected together in an axial direction, at least one of the plurality of magnets being arranged in each of the magnet holes,
   the stacked body having a first holed steel plate and a second holed steel plate,
   the first holed steel plate contacting a first magnet, of two magnets that are adjacent in a circumferential direction from among the plurality of magnets at at least one circumferential portion, the first holed steel plate supporting the first magnet at at least one circumferential portion, and the first holed steel plate not contacting a second magnet, and the second holed steel plate contacting the second magnet, the second holed steel plate supporting the second magnet, and the second holed steel plate not contacting the first magnet.

2. The rotary electric machine rotor according to claim 1, wherein the first magnet and the second magnet are two adjacent magnets that are closest to each other in the circumferential direction, from among the plurality of magnets.

3. The rotary electric machine rotor according to claim 1, wherein the first magnet and the second magnet are arranged one in each of two magnet holes that are adjacent in the circumferential direction, from among the plurality of magnet holes.

4. The rotary electric machine rotor according to claim 1, wherein the first magnet and the second magnet are arranged next to each other in the circumferential direction in one magnet hole, from among the plurality of magnet holes.

5. The rotary electric machine rotor according to claim 1, wherein the first magnet and the second magnet are arranged at a first magnetic pole of the rotary electric machine rotor, the plurality of magnets include a third magnet and a fourth magnet that are arranged next to each other in the circumferential direction at a second magnetic pole of the rotary electric machine rotor, the second magnetic pole being adjacent to the first magnetic pole; and a position of contact between the stacked body and each of the first magnet, the second magnet, the third magnet, and the fourth magnet, is arranged symmetrically on both sides of an inter-magnetic pole plane that passes through the first and the second magnetic poles, the inter-magnetic pole plane including a central axis of the stacked body.

6. The rotary electric machine rotor according to claim 5, wherein the first magnet and the fourth magnet are arranged to an outside of the second magnet and the third magnet, the first holed steel plate contacts the first magnet and the fourth magnet symmetrically with respect to the inter-magnetic pole plane, and the first holed steel plate does not contact the second magnet and the third magnet, and the second holed steel plate contacts the second magnet and the third magnet symmetrically with respect to the inter-magnetic pole plane, and the second holed steel plate does not contact the first magnet and the fourth magnet.

7. The rotary electric machine rotor according to claim 1, wherein a position of contact between the stacked body and the plurality of magnets arranged at a first magnetic pole of the rotary electric machine rotor, or a position of contact between the stacked body and the plurality of magnets arranged at the first magnetic pole and a second magnetic pole of the rotary electric machine rotor, the first and the second magnetic poles being adjacent in the circumferential direction, is gradually offset in one axial direction, in an order of the magnets lined up in one circumferential direction, at at least one portion in the axial direction.

8. The rotary electric machine rotor according to claim 1, wherein a position of contact between the stacked body and at least one of the first magnet or the second magnet, is arranged in at least two locations that are separated by a noncontact portion in the axial direction, inside the magnet hole where the first magnet or the second magnet is arranged, from among the plurality of magnet holes.

\* \* \* \* \*